US006959221B1

(12) United States Patent
Kataoka

(10) Patent No.: US 6,959,221 B1
(45) Date of Patent: Oct. 25, 2005

(54) PORTABLE VIEWING SYSTEM

(75) Inventor: Mitsuteru Kataoka, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,389

(22) PCT Filed: Apr. 1, 1999

(86) PCT No.: PCT/JP99/01715

§ 371 (c)(1),
(2), (4) Date: Nov. 8, 1999

(87) PCT Pub. No.: WO99/52278

PCT Pub. Date: Oct. 14, 1999

(30) Foreign Application Priority Data

Apr. 3, 1998 (JP) .............................. 1998/091185

(51) Int. Cl.[7] ............................................. G06F 17/00
(52) U.S. Cl. ...................................................... 700/94
(58) Field of Search .......................... 700/94; 715/716; 386/124, 113, 95, 98, 100, 102, 104

(56) References Cited

U.S. PATENT DOCUMENTS 5,577,191 A * 11/1996 Bonomi ...................... 345/502
5,623,490 A * 4/1997 Richter et al. .............. 370/263
5,835,789 A * 11/1998 Ueda et al. .................... 710/33
5,914,706 A * 6/1999 Kono .......................... 345/173
5,926,624 A * 7/1999 Katz et al. .................. 709/217
6,233,389 B1 * 5/2001 Barton et al. ................. 386/46

FOREIGN PATENT DOCUMENTS

| JP | 8-18523 | 1/1996 |
| JP | 8-317349 | 11/1996 |
| JP | 9-70026 | 3/1997 |

* cited by examiner

Primary Examiner—Sinh Tran
Assistant Examiner—Andrew Flanders
(74) Attorney, Agent, or Firm—Wenderoth, Lind & Ponack, L.L.P.

(57) ABSTRACT

A main device receives program data provided through broadcasting, internally stores the received program data, and transfers the stored program data to a portable device. Herein, one program data is constituted by a plurality of program components (video, audio, closed caption, and the like). The main device assigns transfer priorities to each program component constituting one program data, and then discretely transfers the program components respectively in the direction of a time axis in the order of the assigned transfer priorities. By discretely transferring data, some of the program components may possibly be entirely transferred to the portable device even when data transfer is discontinued in a short time. Therefore, users can enjoy the entire program by playing-back the already-transferred program components.

19 Claims, 17 Drawing Sheets

FIG. 2

| event_id | TYPE | SIZE | TRANSFER PRIORITY |
|---|---|---|---|
| 0x0001 | C | 100 | 1 |
| 0x0001 | A | 200 | 2 |
| 0x0001 | V | 400 | 3 |
| 0x0002 | C | 50 | 1 |
| 0x0002 | A | 100 | 2 |
| 0x0002 | V | 200 | 3 |
| 0x0003 | C | 50 | 1 |
| 0x0003 | A | 100 | 2 |
| 0x0003 | V | 200 | 3 |

FIG. 5

| TYPE | TRANSFER PRIORITY BY DEFAULT | CLASS |
|---|---|---|
| C | 1 | script |
| A | 2 | script |
| D | 3 | display |
| V | 4 | display |

FIG. 6

| RECEIPT ORDER | OFFSET | SIZE | event_id | TYPE | LENGTH OF PLAY-BACK TIME |
|---|---|---|---|---|---|
| 1 | 0 | 100 | 0x0001 | C | 30 |
| 2 | 100 | 50 | 0x0002 | C | 15 |
| 3 | 150 | 50 | 0x0003 | C | 15 |
| 4 | 200 | 200 | 0x0001 | A | 30 |
| 5 | 400 | 100 | 0x0002 | A | 15 |
| 6 | 500 | 100 | 0x0003 | A | 15 |
| 7 | 600 | 400 | 0x0001 | V | 30 |
| 8 | 1000 | 200 | 0x0002 | V | 15 |
| 9 | 1200 | 200 | 0x0003 | V | 15 |

FIG. 9

| TYPE | CLASS | PRESENTATION PRIORITY |
|---|---|---|
| C | script | 2 |
| A | script | 1 |
| D | display | 2 |
| V | display | 1 |

FIG. 12

| event_id | TYPE | SIZE | TRANSFER PRIORITY |
|---|---|---|---|
| 0x0001 | C | 100 | 1 |
| 0x0001 | A | 200 | 2 |
| 0x0001 | D | 100 | 3 |
| 0x0001 | V | 400 | 4 |
| 0x0002 | A | 100 | 1 |
| 0x0002 | V | 250 | 3 |
| 0x0003 | C | 50 | 1 |
| 0x0003 | A | 100 | 2 |
| 0x0003 | V | 200 | 3 |

FIG. 13

| RECEIPT ORDER | OFFSET | SIZE | event_id | TYPE | LENGTH OF PLAY-BACK TIME |
|---|---|---|---|---|---|
| 1 | 0 | 100 | 0x0001 | C | 30 |
| 2 | 100 | 100 | 0x0002 | A | 15 |
| 3 | 200 | 50 | 0x0003 | C | 15 |
| 4 | 250 | 200 | 0x0001 | A | 30 |
| 5 | 450 | 100 | 0x0003 | A | 15 |
| 6 | 550 | 100 | 0x0001 | D | 30 |
| 7 | 650 | 250 | 0x0002 | V | 15 |
| 8 | 900 | 200 | 0x0003 | V | 15 |
| 9 | 1100 | 200 | 0x0001 | V | 15 |

F I G. 15
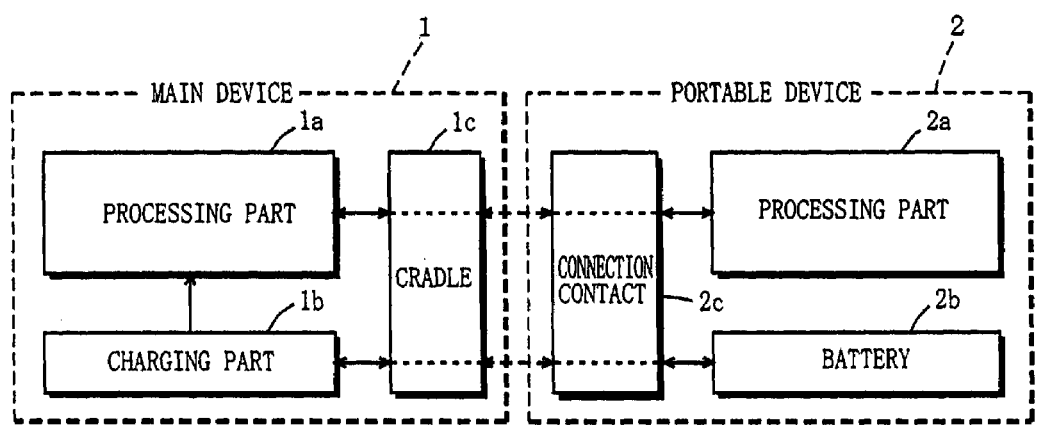

PORTABLE VIEWING SYSTEM

TECHNICAL FIELD

The present invention relates to portable viewing/listening systems, and more particularly to a portable viewing/listening system in which program data that is received by a fixedly or semi-fixedly installed main device is transferred to an easy-to-carry portable device so as to be played-back in the portable device and thereby provide a user of the portable device with the program data.

BACKGROUND ART

Thanks to multi-channeled broadcast and developing video services through communications, the number of programs which are available for general users has been increasing. However, the users' spare-time for watching the programs is limited within a day. Accordingly, the users cannot always watch every program that they are interested in.

Recently, a portable viewing/listening system which enables the users to watch programs in their spare time (during lunch or in transit) has been proposed. A conventional portable viewing/listening system is constituted by a main device which is installed in a house and an easy-to-carry portable device. The main device is at least capable of receiving program data that is provided through broadcasting, internally-storing the received program data, and transferring the stored program data to the portable device.

The conventional portable viewing/listening system, however, takes a long time to transfer the program data from the main device to the portable device. Accordingly, if the users run out of time and thus stop data transfer halfway through, the program data is not entirely transferred, and thus the users cannot enjoy the entire program.

FIG. 18 is a diagram illustrating a data transfer mode which is adopted in the conventional portable viewing/listening system. Hereinafter, by referring to FIG. 18, problems that are associated with the conventional system are described in more detail.

FIG. 18(a) shows a time transition of data constituting a program to be broadcast. In FIG. 18(a), a lateral axis indicates a lapse of time during broadcast, and a vertical axis indicates a bit rate during broadcast, respectively. To be more specific, FIG. 18(a) shows that Program 1 is broadcast between Time t0 and Time t1, Program 2 is broadcast between Time t1 and Time t2, and Program 3 is broadcast between Time t2 and Time t3, respectively. The Program 1, Program 2, and Program 3 are respectively provided with audio, closed caption, and video as program components (mono-media constituting a program). For the sake of clarity, it is herein assumed that a length of broadcast time for the Program 2 (t2–t1) is equal to the length of broadcast time for the Program 3 (t3–t2), and a length of broadcast time for the Program 1 (t1–t0) is exactly twice the length of broadcast time for the Program 2 (or the Program 3). It is also assumed that a bit rate for the respective program components remains invariant no matter which Program, and thus a ratio among a bit rate of closed caption bc, bit rate of audio ba, and bit rate of video by is always 1:2:4.

FIG. 18(b) shows a time transition which takes place when the program data is transferred from the main device to the portable device in the conventional portable viewing/listening system. In FIG. 18(b), a lateral axis indicates a lapse of time in a data transfer operation, and a vertical axis indicates a bit rate during transfer, respectively. As shown in FIG. 18(b), transfer of the program components of the Program 1, Program 2, and Program 3 is completed between Time t4 and Time t9. In FIG. 18(b), unlike the bit rate during broadcast shown in FIG. 18(a), the bit rates for the program components during transfer are each compressed or extended in the direction of a time axis according to characteristics of data for the respective program components. However, the program components herein are basically transferred in the same order as those during broadcast. This means that every program component of the Program 1 is transferred between Time t4 and Time t7, every program component of the Program 2 is transferred between Time t7 and Time t8, and every program component of the Program 3 is transferred between Time t8 and Time t9, respectively. A ratio among (t7–t4), (t8–t7) and (t9–t8), all of which indicate a length of time which is taken to transfer each Program, is 2:1:1. This is equal to the ratio among (t1–t0), (t2–t1) and (t3–t2), all of which indicate a length of broadcast time for each Program. Assuming that a total bit rate for closed caption, audio and video during transfer is a -time as much as a total bit rate during broadcast, a ratio between a length of broadcast time of a certain program and a length of time which is taken to transfer the program is always α:1.

FIG. 18(c) shows a case where a transfer of program data is discontinued halfway at Time to in the conventional portable viewing/listening system. In this example, the Time tα is assumed to satisfy t7<tα<t8. As transfer of the program data is discontinued in the middle of the Program 2 between Time t7 and Time t8, the entire data of the Program 1 and a partial amount of the data of the Program 2 from its beginning to Time tα is transferred to the portable device. However, as to the remaining portion of the data of the Program 2 and the entire data of the Program 3, none of the program components, i.e., closed caption, audio and video, included therein is transferred to the conventional portable viewing/listening system. As to the not-transferred part of data, the portable device does not inform the users what the non-transferred data is. Therefore, the users cannot even know whether or not the non-transferred data is interesting enough to watch.

SUMMARY OF THE INVENTION

Therefore, an object of the present invention is to provide a portable viewing/listening system which guarantees the minimum play-back quality that is required for the users on the portable device side even when data transfer from the main device to the portable device is discontinued in a short time.

The present invention has the following features to attain the object described above.

A first aspect of the present invention is directed to a portable viewing/listening system in which program data that is received by a fixedly or semi-fixedly installed main device is playedback in an easy-to-carry portable device so as to provide a user with the program data.

The main device of the first aspect comprises:

receiving means for receiving program data that is provided through broadcasting;

primary storing means for storing the program data received by the receiving means;

transfer priority assigning means for assigning transfer priorities to each program component constituting the program data that is stored in the primary storing means; and transferring means for discretely transferring, to the portable device, each of the program components of the program data that is stored in the primary storing means in the direction of a time axis in the order of the assigned transfer priorities.

The portable device of the first aspect comprises:
secondary storing means for storing the program components to be discretely transferred from the transferring means;
re-constructing means for re-constructing program data included in any program that is desired to played-back from the program components which are stored in the secondary storing means; and
playing-back means for playing-back the program data that is re-constructed by the re-constructing means.

As described above, in the first aspect, each program component constituting the program data simultaneously received by the main device is assigned a transfer priority, and the program components are discretely transferred, to the portable device, in the direction of the time axis in the order of the assigned transfer priorities. Therefore, even if data transfer from the main device to the portable device is discontinued in a short time (i.e., prematurely), there is a high possibility that some of the program components are entirely transferred to the portable device. Accordingly, the users can enjoy, albeit incomplete, the entire program by playing-back the already-transferred program components.

According to a second aspect of the present invention, in accordance with the first aspect,
the transfer priority assigning means assigns transfer priorities to each of the program components in such a manner that a program component with a smaller amount of data has a higher transfer priority.

As described above, in the second aspect, any program component having a smaller amount of data has a higher transfer priority from the main device to the portable device. This means, that a length of time which is taken to transfer the program component having the higher transfer priority is shorter. Consequently, if data transfer is presumably discontinued in the system of the present invention and in the conventional one at the same time, the number of program components which are successfully transferred to the portable device in the system of the present invention is larger.

According to a third aspect of the present invention, in accordance with the second aspect,
the main device further comprises transfer priority defining means for previously defining transfer priorities by default to every type of the program components, and
the transfer priority assigning means assigns, in accordance with a definition provided by the transfer priority defining means, the transfer priorities by default to each of the program components.

As described above, in the third aspect, each of the program components is assigned, in the main device, the transfer priorities by default according to the type thereof. Therefore, the program components can be transferred in an order which is appropriately determined by the characteristics thereof.

According to a fourth aspect of the present invention, in accordance with the third aspect, when the plurality of program data stored in the primary storing means are collectively transferred to the portable device, the transferring means selects any program component having the same transfer priority from each of the program data, combines the selected program components into a unit, and then discretely transfers the combined unit in the direction of the time axis in the order of the transfer priorities that are assigned to every combined unit.

As described above, in the fourth aspect, when a plurality of program data is collectively transferred to the portable device, the data is not transferred on a program basis but instead on a transfer priority basis. That is, the program components having the same transfer priority are selected from the respective program data, the selected program components are combined to a unit, and then the combined unit is transferred in the order of the transfer priorities which are assigned to every combined unit. Therefore, the programs are assigned transfer priorities in a fair manner, and as a result, variation in arriving time of the programs can be prevented.

According to a fifth aspect of the present invention, in accordance with the fourth aspect,
types of the program components are classified into a plurality of classes by the transfer priority defining means. Further,
the transfer priority assigning means checks every class for the transfer priorities by default which are assigned to each of the program components, and then changes, in accordance with a result of the check, the transfer priorities by default which are assigned to each of the program components on a class basis, as required.

As described above, in the fifth aspect, the types of the program components are classified into a plurality of classes, and the transfer priorities are checked on a class basis before making a change, if any. Therefore, the transfer priorities can be managed on a class basis.

According to a sixth aspect of the present invention, in accordance with the fifth aspect,
when no program component in the same class has a value which is defined as being a top transfer priority therein, the transfer priority assigning means changes a value of a program component being currently the highest transfer priority in the class to the value which is defined as being the top priority therein.

As described above, in the sixth aspect, even if the types of the program components in the same class are varying, some of the program components are managed to reach the portable device when the first unit for each class is transferred.

According to a seventh aspect of the present invention, in accordance with the first aspect,
the main device further comprises program component generating means for generating a new program component from the program components of the program data received by the receiving means, and
the storing means adds the program component that is newly generated by the program component generating means to the program data received by the receiving means and stores the same.

As described above, in the seventh aspect, another program component can be newly generated from the received program components and transferred. It is effective for a case where the received program data is hierarchically encoded into a plurality of layers so that the program components in the respective layers are transferred, or for a case where the received detailed video is decimated to generate and transfer a non-detailed video.

According to an eighth aspect of the present invnetion, in accordance with the first aspect,
when any data of the program component of the program data that is re-constructed by the re-constructing means is discontinued halfway during play-back by the playing-back means, the portable device further comprises replacing means for having any other program component being not currently played-back to play-back as a replacement.

As described above, in the eighth aspect, the program component which was not entirely played-back due to the discontinued data transfer is replaced by any other program component to be played-back. Therefore, the users can enjoy the entire program. According to a ninth aspect, in the eighth aspect, the program component which was not entirely played-back due to the discontinued data transfer is replaced by any other program component to play-back. Therefore, the users can enjoy the entire program.

According to a ninth aspect of the present invention, in accordance with the eighth aspect, the protable device further comprises prentation priority defining means for previously defining presentation priorities to each type of the program components, and the replacing means determines a program component to be played-back as a replacement in accordance with the definition that is provided by the presentation priority defining means.

As described above, in the ninth aspect, the portable device is set to determine the program component as a replacement in accordance with the presentation priorities which are defined to every type of the program components. Therefore, the program components can be replaced to be played-back in an order which is suitably determined by the characteristics thereof.

According to a tenth aspect of the present invention, in accordance with the ninth aspect, types of the program components are classified into a plurality of classes by the presentation priority defining means, and the replacing means determines a program component to be played-back as a replacement from among the program components belonging to the same class as does the program component discontinued during playback.

As described above, in the tenth aspect, the replacing order to be played-back can be managed on a class basis.

According to an eleventh aspect of the present invention, in accordance with the first aspect, the main device and the portable device are structured to be electrically interconnectable, and the transferring means online-transfers each program component of the program data that is stored in the primary storing means directly to the portable device.

As described above, in the eleventh aspect, the main device and the portable device are electrically interconnectable. Consequently, program data can be transferred on-line.

According to a twelfth aspect of the present invention, in accordance with the eleventh aspect, the main device further comprises attaching means for allowing the portable device to be electrically connected, and charging means for supplying power to charge the portable device when the portable device is attached to the attaching means.

Further, according to the twelfth aspect the portable device also comprises a battery to be charged by the power which is supplied from the charging device.

As described above, in the twelfth aspect, transfer of the program data and charging of the portable device can be done at the same time.

According to a thirteenth aspect of the present invention, in accordance with the first aspect, the transferring means offline-transfers each program component of the program data that is stored in the primary storing means to the portable device through a recording medium.

As described above, in the thirteenth aspect, data can be off-line transferred from the main device to the portable device through a recording medium. Therefore, such a structure eases restrictions which are imposed on the physical layout of the main device and the portable device. Furthermore, a plurality of recording media will increase a substantial memory capacity.

According to a fourteenth aspect of the present invention, in accordance with the thirteenth aspect, the main device further comprises writing means for writing any program component to be transferred to the portable device into the recording medium, and the portable device further comprises reading means for reading the program component that is recorded in the recording medium.

According to a fifteenth aspect of the present invention, in accordance with the first aspect, the receiving means receives program data through a computer network.

A sixteenth aspect of the present invention is directed to a main device which is used in a state of being fixedly or semi-fixedly installed, and which is used to transfer any received program data to an easy-tocarry portable device. The main device of the sixteenth aspect comprises:

receiving means for receiving program data that is provided through broadcasting;

primary storing means for storing the program data received by the receiving means;

transfer priority assigning means for assigning transfer priorities to each program component constituting the program data that is stored in the primary storing means; and transferring means for discretely transferring, to the portable device, each of the program components of the program data that is stored in the primary storing means in the direction of a time axis in the order of the assigned transfer priorities.

As described above, in the sixteenth aspect, each of the program components constituting program data simultaneously received is assigned a transfer priority, and the program components are discretely transferred, to the portable device, in the direction of the time axis in the order of the assigned transfer priorities. Therefore, even when data transfer to the portable device is discontinued in a short time, some of the program components may possibly be entirely transferred thereto. Accordingly, the users can enjoy the whole program, albeit incomplete, by playing-back the already-transferred program components.

According to a seventeenth aspect of the present invention, in accordance with the sixteenth aspect, the transfer priority assigning means assigns transfer priorities to each program component in such a manner that a program component with a smaller amount of data has a higher transfer priority.

As described above, in the seventeenth aspect, any program component having a smaller amount of data has the higher transfer priority. This means, that a length of time which is taken to transfer the program component having the higher transfer priority is shorter. Consequently, if data transfer is presumably discontinued in the system of the present invention and in the conventional one at the same time, the number of program components that are successfully transferred to the portable device in the system of the present invention is larger.

According to an eighteenth aspect of the presnet invention, in accordance with the seventeenth aspect, the main device further comprises transfer priority defining means for previously defining transfer priorities by default to each type of the program components, and the transfer priority assigning means assigns the transfer priorities by default to each of the program components in accordance with a definition which is provided by the transfer priority defining means.

As described above, in the eighteenth aspect, each of the program components is assigned the transfer priorities by default according to the type thereof. Therefore, the program components can be transferred in an order that is appropriately determined by the characteristics thereof.

According to a nineteenth aspect of the present invention, in accordance with the eighteenth aspect, when the plurality of program data stored in the primary storing means are collectively transferred to the portable device, the transferring means selects any program component having the same transfer priority from each of the program data, combines the selected program components into a unit, and then discretely transfers the combined unit in the direction of the time axis in the order of the transfer priorities which are assigned to every combined unit.

As described above, in the nineteenth aspect, when a plurality of program data are collectively transferred to the portable device, the data is not transferred on a program basis but instead on a transfer priority basis. That is, the program components having the same transfer priority are selected from the respective program data, the selected program components are combined to a unit, and then the combined unit is transferred in the order of the transfer priorities which are assigned to every combined unit. Therefore, the programs are assigned transfer priorities in a fair manner, and as a result variation in arriving time of the programs can be prevented.

According to a twentieth aspect of the present invnetion, in accordance with the nineteenth aspect, types of the program components are classified into a plurality of classes by the transfer priority defining means. Further, the transfer priority assigning means checks every class for the transfer priorities by default which are assigned to each of the program components, and then changes, in accordance with a result of the check, the transfer priorities by default which are assigned to each of the program components on a class basis, as required.

As described above, in the twentieth aspect, the types of the program components are classified into a plurality of classes, and the transfer priorities are checked on a class basis before making a change, if any. Therefore, the transfer priorities can be managed on a class basis.

According to a twenty-first aspect of the present invention in accordance with the twentieth aspect, when no program component in the same class has a value which is defined as being a top transfer priority therein, the transfer priority assigning means changes a value of a program component being currently the highest transfer priority in the class to the value which is defined as being the top priority therein.

As described above, in the twenty-first aspect, even when the types of the program components in the same class are varying, some of the program components are managed to reach the portable device when the first unit for each class is transferred.

According to a twenty-second aspect of the present invention, in accordance with the sixteenth aspect, the main device further comprises program component generating means for generating a new program component from the program components of the program data received by the receiving means. Further, according to the twenty-second aspect, the storing means adds the program component that is newly generated by the program component generating means to the program data received by the receiving means, and stores the same.

As described above, in the twenty-second aspect, another program component can be newly generated from the received program components and is transferred. It is effective for a case where the received program data is hierarchically encoded into a plurality of layers so that the program components in the respective layers are transferred, or for a case where the received detailed video is decimated to generate and transfer a non-detail video.

A twenty-third aspect of the present invention is directed to a portable device for receiving and playing-back program data that is received by a fixedly or semi-fixedly installed main device so as to provide a user of the portable device with the received program data. The portable device of the twenty-third aspect comprises:

secondary storing means for storing each program component of the program data to be discretely transferred from the main device;

re-constructing means for re-constructing program data of a program that is desired to be played-back from the program components stored in the secondary storing means; and playing-back means for playing-back the program data that is re-constructed by the re-constructing means.

As described above, in the twenty-third aspect, in a case where the program components of the program data are discretely transmitted from the main device, the program data that is included in any program which is desired to be played-back can be re-constructed from the received program components and is played-back.

According to a twenty-fourth aspect of the present invention, in accordance with the twenty-third aspect, when data of the program component of the program data which is re-constructed by the re-constructing means is discontinued halfway during play-back by the playing-back means, the portable device further comprises replacing means for having any other program component being not currently played-back to be played-back as a replacement.

As described above, in the twenty-fourth aspect, the program component which was not entirely played-back due to a discontinued data transfer is replaced by any other program component to be played-back. Therefore, the users can enjoy the entire program.

According to a twenty-fifth aspect of the present invention, in accordance with the twenty-fourth aspect, the portable device further comprises presentation priority defining means for previously defining presentation priorities to each type of the program components, and the replacing means determines a program component to be played-back a replacement in accordance with a definition which is provided by the presentation priority defining means.

As described above, in the twenty-fifth aspect, the portable device is set to determine the program component as a replacement in accordance with the presentation priorities which are defined to every type of the program components. Therefore, the program components can be replaced to be played-back in an order which is suitably determined by the characteristics thereof.

According to a twenty-sixth aspect of the present invention, in accordance with the twenty-fifth aspect, types of the program components are classified into a plurality of classes by the presentation priority defining means, and the replacing means determines a program component to be played-back as a replacement from among the program components belonging to the same class as does the program component that is discontinued during play-back.

As described above, in the twenty-sixth aspect, the replacing order to be played-back can be managed on a class basis.

A twenty-seventh aspect of the present invention is directed to a method of transferring program data that is received by a fixedly or semi-fixedly installed main device to an easy-to-carry portable device. The method comprises steps of:

receiving program data that is provided through broadcasting;

storing the received program data;

assigning transfer priorities to each program component constituting the stored program data; and discretely transferring, to the portable device, each of the program components of the stored program data in the direction of a time axis in the order of the assigned transfer priorities.

As described above, in the twenty-seventh aspect, each program component constituting the program data that is simultaneously received by the main device is assigned a transfer priority, and the program components are discretely transferred, to the portable device, in the direction of the time axis in the order of the assigned transfer priorities. Therefore, even if data transfer from the main device to the portable device is discontinued in a short time (i.e., prematurely there is a high possibility that some of the program components are entirely transferred to the portable device. Accordingly, the users can enjoy, albeit incomplete, the entire program by playing-back the already transferred program components.

BRIEF DESCRIPTION OF THE DRAWINGS

FIG. 2 is a diagram exemplarily showing a storage list which is stored in a memory 112 in a main device 1 shown in FIG. 1.

FIG. 5 is a diagram exemplarily showing a transfer priority table which is stored in the memory 112 in the main device 1 shown in FIG. 1.

FIG. 6 is a diagram exemplarily showing a receipt list which is stored in a memory 208 in the portable device 2 shown in FIG. 1.

FIG. 9 is a diagram exemplarily showing a class table which is stored in the memory 208 in the portable device 2 shown in FIG. 1.

FIG. 12 is a diagram exemplarily showing a storage list to be generated when the received data includes a digest video in the main device 1 in FIG. 1.

FIG. 13 is a diagram exemplarily showing a receipt list to be generated when the data that is transferred from the main device 1 includes a digest video in the portable device 2 in FIG. 1.

FIG. 15 is a block diagram showing the electric structure of the portable viewing/listening system according to the second embodiment of the present invention.

Figure 1:
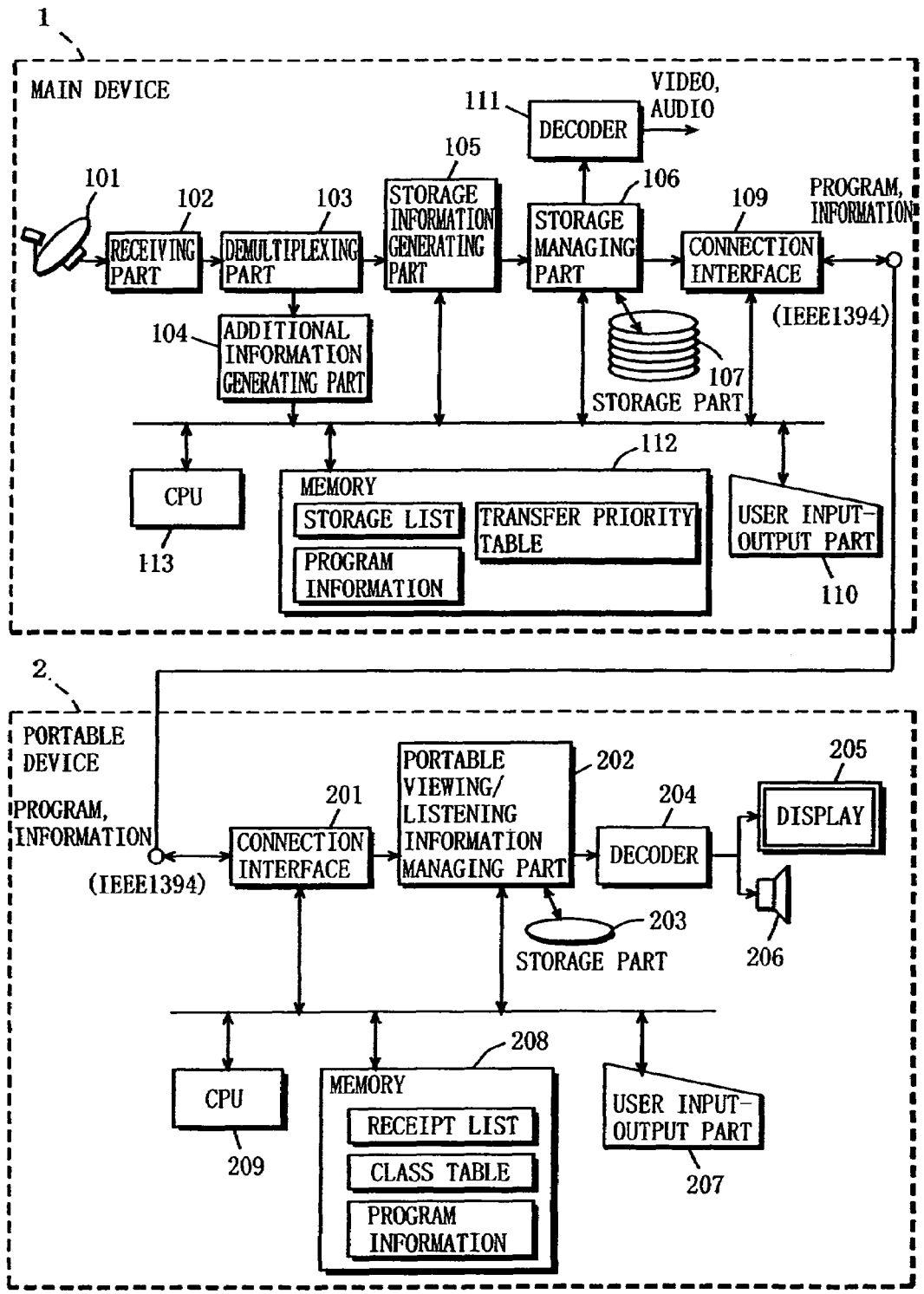
FIG. 1 is a block diagram showing the structure of a portable viewing/listening system according to a first embodiment of the present invention.

DETAILED DESCRIPTION OF THE INVENTION (Outline of the System)

The portable viewing/listening system described in the following embodiments is constituted by a main device which is fixedly or semi-fixedly installed in a house and an easy-to-carry portable playing-back device (hereinafter, referred to as a portable device). The main device includes at least a function of receiving (in some cases, a function of playing-back is included) program data that is provided through broadcasting (both broadcast transmitted over radio waves, and broadcast transmitted through a cable transmission path are included), a function of internally storing the received program data, and a function of online-transferring or offline-transferring the stored program data to the portable device. To online-transfer any selected program data, the portable device is connected to the main device. The portable device then internally stores the program data that is transferred from the main device, and plays-back the stored program data at the users' convenience. On the other hand, to offline-transfer the program data, the main device once writes the internally stored program data to a recording medium (video tape, rewritable optical disk, solid memory card, and the like). After the writing, the recording medium is detached from the main device and is then attached to the portable device. Accordingly, in this case, the portable device reads any desirable program data from the attached recording medium and then plays-back the same.

A distinctive characteristic of the system of the present invention lies in a method of transferring data from the main device to the portable device. Specifically, this system discretely transfers data from the main device to the portable device. As described in the foregoing, one program data is generally constituted by a plurality of program components (video, audio, closed caption, for example). As these program components are being concurrently played-back, the program components are conventionally transferred to the portable device at one time. On the other hand, in this system, every program component constituting one program data is assigned a transfer priority so as to be discretely transferred in the direction of a time axis according to the given order of priorities.

With such data transfer being discretely executed, some of the program components may possibly be entirely transferred to the portable device even if data transfer from the main device to the portable device is discontinued in a short time (i.e., prematurely). Therefore, the users can enjoy the entire program, albeit incomplete, by playing-back the already-transferred program components. In the aforementioned conventional portable viewing/listening system, however, none of the program components of the program data is entirely transferred if data transfer to the portable device is discontinued in a short time. As a result, the users cannot enjoy the entire program.

First Embodiment

FIG. 1 is a block diagram showing the structure of a portable viewing/listening system according to a first embodiment of the present invention. In FIG. 1, the portable viewing/listening system of the first Embodiment includes a main device 1 and a portable device 2. The portable device 2 is detachable/attachable from/to the main device 1.

The main device 1 includes an antenna 101, a receiving part 102, a demultiplexing part 103, an additional information generating part 104, a storage information generating part 105, a storage managing part 106, a storage part 107, a connection interface 109, a user input-output part 110, a decoder 111, a memory 112, and a CPU 113.

The receiving part 102 includes a tuner and a demodulator which are constituents of a typical digital broadcast receiver. The receiving part 102 receives a broadcast wave that is received by the antenna 101, and outputs a digital stream. Video information, audio information, additional information and the like are multiplexed into the digital stream. A specific format for the digital stream may be MPEG-2 TS (Transport Stream), for example. Note that MPEG-2 TS, and multiplexing by MPEG-2 TS are standardized by the international standard of MPEG-2 Systems.

The demultiplexing part 103 is constituted by a TS processor, for example, and separates the digital stream that is outputted from the receiving part 102 into the video information, the audio information, the additional information, and the like. When the digital stream is MPEG-2 TS, the demultiplexing part 103 classifies TS packets being the smallest unit of the digital stream according to values of packet ID (pid) which are written in TS packet headers so as to separate the multiplexed video information, audio information, additional information, and the like.

The additional information generating part 104 receives information that is relevant to the additional information from among the information that is included in the digital stream which is separated by the demultiplexing part 103 so as to generate additional information. A format for the additional information is a section format defined in DVB-SI being the international standard, for example. In DVB-SI, a method of transmitting information which is relevant to a broadcast channel (pid, for example) and information which is relevant to an EPG (Electric Program Guide) is defined as a data format based on the section format. The information relevant to the EPG, for example, is transmitted in the section format called EIT (Event Information Table). To transmit information in the section format, information to be transmitted is divided into a certain size or smaller, and is repeatedly transmitted. In this manner, the additional information generating part 104 collects and merges the divided information into one data, and updates the information if the contents thereof have been changed.

The storage information generating part 105 converts the video information and audio information that are inputted from the demultiplexing part 103 into a format which is suitable for storing in the storage part 107, and then outputs the converted information to the storage managing part 106. The storage information generating part 105 also generates both detailed video information and non-detailed video information in accordance with the video information that is inputted from the demultiplexing part 103 as is required. The non-detailed video information is of inferior image quality to the detailed video information but has a smaller amount of data. Accordingly, the non-detailed video information is done with a transfer processing that is quicker than the detailed video information.

Both detailed video information and non-detailed video information are generated in the storage information generating part 105 in a first case where the CPU 113 instructs the storage information generating part 105 to generate the non-detailed video information. If this is the case, the storage information generating part 105 outputs the video information that is inputted from the demultiplexing part 103 as detailed video information in its current form. Further, the storage information generating part 105 changes the resolution of the video information that is inputted from the demultiplexing part 103 or intermittently decimates frames thereof so as to generate and output the non-detailed video information.

Both detailed video information and non-detailed video information are generated in the storage information generating part 105 in a second case where the video information that is inputted from the demultiplexing part 103 includes the non-detailed video information as well as the detailed video information from the beginning. There may be a case where the received video information is hierarchically encoded or a case where the received video information is transmitted in a hierarchical transmission mode, for example. If this is the case, the video information that is inputted from the demultiplexing part 103 is multi-layered in varying image qualities, and the upper layer has the more codes and the better image. In this manner, the storage information generating part 105 outputs the video information that is included in the top layer as detailed video information without any change. Further, the storage information generating part 105 outputs the video information that is included in the lower layer as non-detailed video information. To generate video information corresponding to the respective layers, a method of selecting layers which is used in the typical digital broadcast receiver can be used as it is.

The storage information generating part 105 outputs the aforementioned non-detailed video information to the storage managing part 106 as video information for a digest video. Accordingly, the CPU 113 manages the non-detailed information which is stored in the storage part 107 as the video information for the digest video. Note that, in the first embodiment, the detailed information and non-detailed information are generated only for video. However, the detailed information and non-detailed information may be generated for audio as well depending on the particular situation.

The storage managing part 106 and the storage part 107 are interconnected, and the storage managing part 106 controls information writing and reading with respect to the storage part 107 under the control of the CPU 1113. The storage part 107 is constituted by a relatively large-capacity storage device using a hard disk or DVD-RAM, for example. The storage part 107 stores program data.

The connection interface 109 is used to physically and electrically connect the main device 1 to other devices, and to transmit video, audio or other digital information from/to the other devices. Such a connection interface 109 may be a typical input-output interface for digital information including an interface of IEEE1394.

The user input-output part 110 receives inputs from the users or presents the users in which state the device is. Such a user input-output part 110 is exemplarily constituted by an infrared remote controller, remote control photoreceiving part, pilot lamp, and the like. Information is presented to the users also through a GUI operation utilizing OSD (On Screen Display) that is included in the video information outputted from the decoder 111. In this case, the users push buttons which are provided for the remote controller while observing the OSD, for example, so as to play-back or erase stored programs, or preselect or transfer programs.

The memory 112 stores various information relating to the operation of the main device 1. To be more specific, the memory 112 stores program information that is used to execute operation control of the main device 1, additional information that is outputted from the additional information generating part 104, and storage management information that is used to manage the information stored in the storage part 107, for example.

The CPU 113 and other constituents which are provided in the main device 1 are interconnected, and the CPU 113 executes the program information that is stored in the memory 112 so as to collectively control those constituents.

The portable device 2 includes a connection interface 201, a portable viewing/listening information managing part 202, a storage part 203, a decoder 204, a display 205, a speaker 206, a user input-output part 207, a memory 208, and a CPU 209.

The connection interface 201 is physically and electrically connected to the connection interface 109 in the main device 1, and is used to receive video, audio and other digital information from the main device 1. Such a connection interface 201 may be a typical input-output interface for digital information including the interface of IEEE1394.

The portable viewing/listening information managing part 202 and the storage part 203 are interconnected. The storage part 203 is constituted by a storage device using a hard disk, DVD-RAM, or solid memory, for example. Since the storage part 203 is installed in the portable device 2, it is preferred that the storage part 203 be downsized. The storage part 203 stores program data to be transferred from the main device 1.

The decoder 204 receives and decodes the program data which is stored in the storage part 203 so as to convert the data into analog video/audio signals. The display 205 is constituted by a liquid crystal display or a small-sized CRT display, for example, and receives the analog video signals that are outputted from the decoder 204 so as to display the corresponding image thereon. The speaker 206 receives the analog audio signals that are outputted from the decoder 204 so as to output the corresponding audio therefrom.

The user input-output part 207 receives inputs from the users, and presents the users in which state the device is. Such a user input-output part 110 is exemplarily constituted by an infrared remote controller, remote control photoreceiving part, pilot lamp, and the like. Information is also presented to the users through the GUI operation utilizing an OSD which is displayed on the display 205. In this case, the users push buttons which are provided for the remote controller while observing the OSD, for example, so as to set to play-back or erase stored programs, or preselect or transfer programs.

The memory 208 stores various information that is relevant to an operation of the portable device 2. In detail, the memory 208 stores program information which is used to execute operation control of the portable device 2, storage management information which is used to manage the information stored in the storage part 203, and the like.

The CPU 209 and other constituents in the portable device 2 are interconnected, and the CPU 209 executes the program information which is stored in the memory 208 so as to collectively control these constituents.

FIG. 2 is a diagram exemplarily showing the structure of a storage list to be stored in the memory 112 of the main device 1. This storage list is data for managing the program data which is stored in the storage part 107 of the main device 1, and is tablestructured. Specifically, each line of the table represents a single program component for a particular program. The storage list of FIG. 2 exemplarily shows that the storage part 107 stores eight program components in total. Each line of the table includes four attributes of event_id, type, size, and transfer priority.

The attribute "event_id" is attribute information for identifying the programs. In this example, for the sake of simplicity, event_id for the Program 1, Program 2 and Program 3 are assumed to be 0x0001, 0x0002, 0x0003, respectively. Herein, "0x" indicates that a hexadecimal digital follows.

The attribute "type" is attribute information for single program component for identifying the types of program components. Characters "C", "A", and "V" which are found in the storage list of FIG. 2 respectively represent Closed Caption, Audio and Video. Digest video represented by "D" is further included therein. This will be described later.

The attribute "size" indicates a size of the area in the storage part 107 that is occupied by the corresponding program component. A size unit herein may simply be a bite, or a block which is represented by the number of blocks in a given size.

The attribute "transfer priority" is attribute information which is used to determine in which order the program components are transferred when the program data is transferred from the main device 1 to the portable device 2. In this example, the smaller value has the higher priority.

Among the attributes in FIG. 2, when the program is received, event_id, type and size can be obtained from the information that is transmitted as additional information for the program. The transfer priorities are established when the transfer processing of at least one program is executed.

Figure 3:
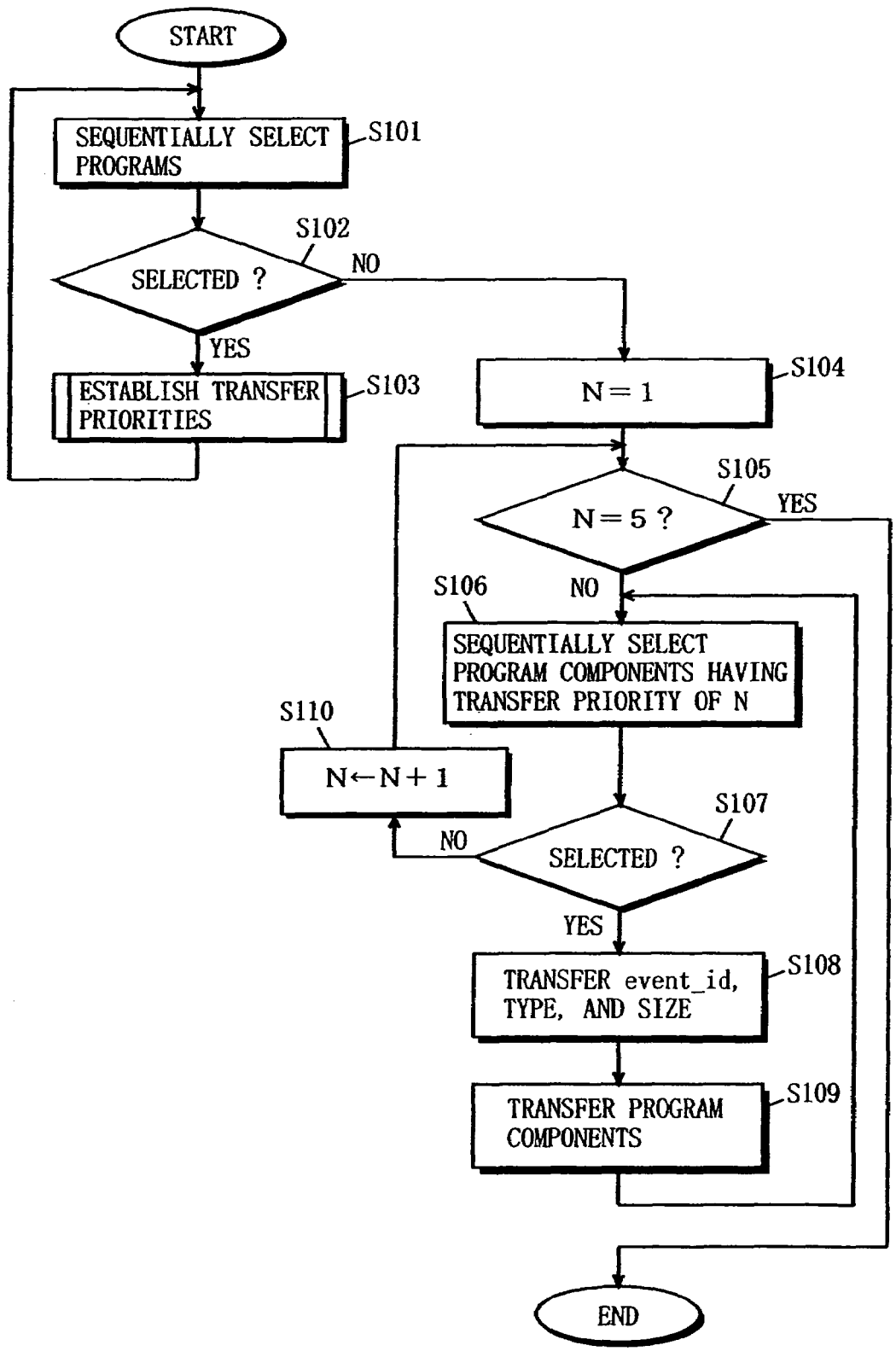
FIG. 3 is a flowchart illustrating an operation that is performed on the main device side when program data is transferred from the main device 1 to a portable device 2 in the portable viewing/listening system of the first embodiment of the present invention.

FIG. 3 is a flowchart illustrating an operation which is executed on the main device side when the program data is transferred from the main device 1 to the portable device 2 in the portable viewing/listening system of the first embodiment. The processing of FIG. 3 is realized when the CPU 113 in the main device 1 executes the program information which is stored in the memory 112 in the main device 1. Hereinafter, by referring to FIG. 3, the operation whereby the main device 1 transfers the program data to the portable device 2 is described.

First, the CPU 113 selects a first program from among the programs which are stored in the storage part 107 (step S101). The storage list (see FIG. 2) which is stored in the memory 112 is referred to so as to know what programs are stored in the storage part 107. Taking the storage list of FIG. 2 as an example, "Program 1 "is the program to be selected first from the stored data of the Program 1, Program 2, and Program 3. Thereafter, the CPU 113 judges whether or not any program was selected in step S101 (step 5102). In this example, since "Program 1" was selected in step 5101, the CPU 113 goes to step S103.

In step S103, the CPU 113 sets transfer priorities for each program component constituting the program that is selected in step S101. For details of this subroutine step S103, see FIG. 4.

Figure 4:
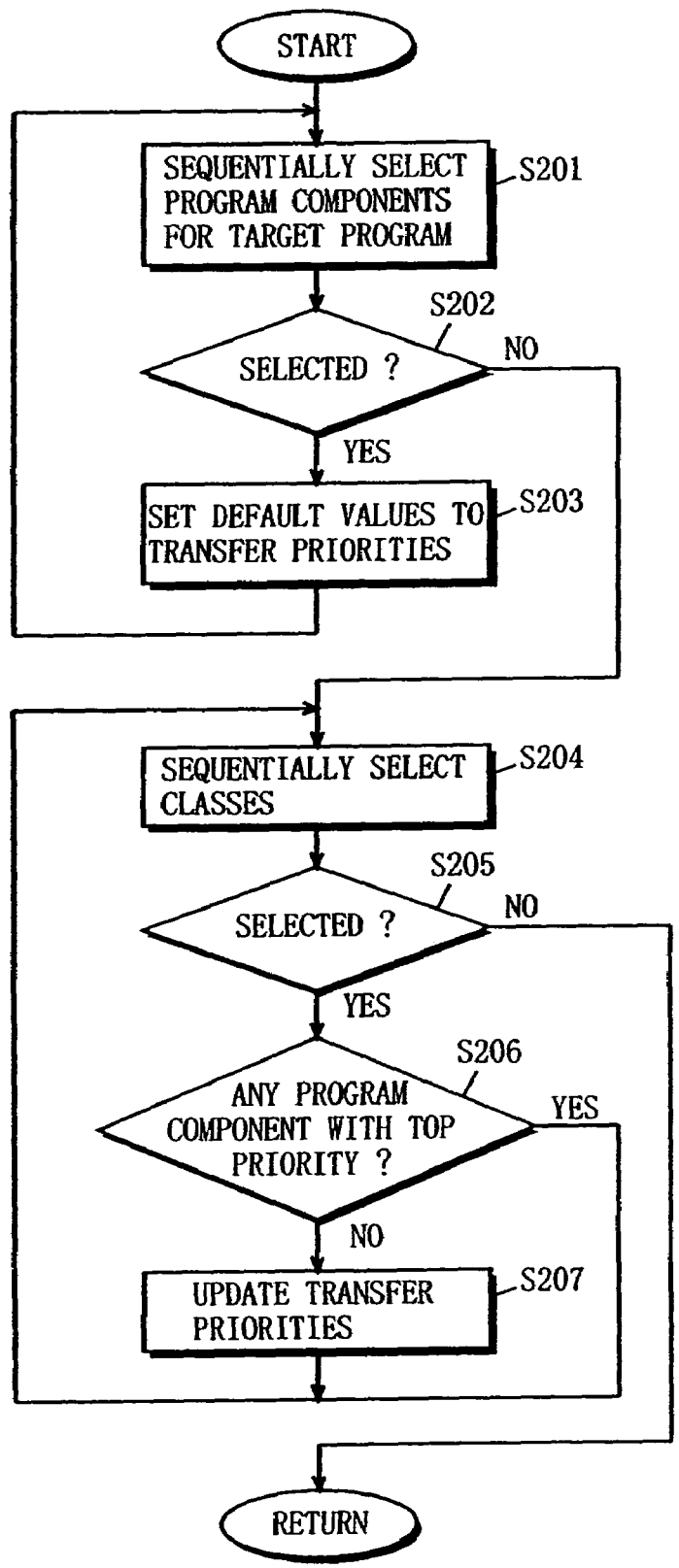
FIG. 4 is a flowchart illustrating a detailed operation of a subroutine step S103 in the flowchart of FIG. 3.

By referring to FIG. 4, the CPU 113 sequentially selects the program components constituting the target program (first "Program 1" in this example) that is selected in step S101 (step S201). Thereafter, the CPU 113 judges whether or not any program component was selected in step S201 (step S202). If yes, the CPU 113 provides the program component that is selected in step S201 with an applicable default value which is predetermined for every type of program components as a transfer priority (step S203).

FIG. 5 shows a transfer priority table in which the default values indicating the transfer priorities for each type of the program components are defined. The transfer priority table of FIG. 5 is stored in the memory 112, for example. In FIG. 5, as an example, the default values of 1, 2, 3 and 4 as transfer priorities are respectively assigned to the types C, A, D and V. The transfer priority table of FIG. 5 has a class which is defined for each type. The class herein shows the classified types of program components. Preferably, data that is replaceable with each other is classified into the same class. For example, audio can be replaced by closed caption, and detailed video can be replaced by digest video. In step S203, the CPU 113 first refers to the transfer priority table of FIG. 5, and then sets transfer priorities by default for every program component in the storage list of FIG. 2.

After step S203 is performed, the CPU 113 returns to step S201 and selects the next program component for the target program. Thereafter, the CPU 113 assigns a transfer priority for the selected program component by referring to the transfer priority table of FIG. 5 (step S203).

After steps S201 to S203 are repeated, and after each program component constituting the target program is assigned a transfer priority, the program components to be selected in step S201 would have all been gone by then. Therefore, the CPU 113 determines that no program component was selected in step S202, and advances to step S204.

In step S204, the CPU 113 selects the classes that are defined in the transfer priority table of FIG. 5 in the given order. In this example, two classes of "script" and "display" are defined in the transfer priority table of FIG. 5. Accordingly, in step S204, either one of the "script" or "display" is initially selected, the other one is selected second, and a third selection results in no class being selected. Thereafter, the CPU 113 judges whether or not any class was selected in step S204 (step 5205). If yes, the CPU 113 then judges whether or not the program component that is defined in the selected class as being a top transfer priority is included in the target program (step S206). By referring to the transfer priority table in FIG. 5, for example, one of the program components which is classified in the class of "script" is in type "C" with a transfer priority of "1", and the other program component is in type "A" with a transfer priority of "2". It means, in the class of "script", the program component in type "C" is defined as being the top priority. Similarly, as to the program components which are classified in the class of "display", the program component in type "D" is assigned with a transfer priority of "3", and thus is defined as being the top priority in the class of "display". Therefore, according to the definition of the transfer priority table of FIG. 5, in step S206, the CPU 113 judges whether or not the target program includes any program component in type "C" when the currently selected class is "script". On the other hand, when the currently selected class is "display", the CPU 113 judges whether or not the target program includes any program component in type "D".

When the target program has no program component which is defined as being the top transfer priority in the selected class, the CPU 113 selects any program component having the highest transfer priority next to the top priority, and updates the priority value thereof to a value which is defined as being the top priority in the class (step S207). In a case where the class of "script" is currently selected and each program component that is included in the target program is in type "A", the transfer priority for the program component in type "A" is updated from the default value of "2" to "1", which is defined as being the top priority in the class. Similarly, in a case where the class of "display" is currently selected and each program component that is included in the target program is in type "V", the transfer priority for the program component in type "V" is updated from the default value of "4" to "3", which is defined as being the top priority in the class. Each update in step S207 is reflected in the storage list of FIG. 2. That is, any applicable transfer priority for the program component in the storage list is updated. Thereafter, the CPU 113 returns to step S204. Note that, when the target program has any program component which is defined as being the top transfer priority in the selected class, the CPU 113 returns to step S204 without updating any transfer priority.

Next, the CPU 113 selects the next class from the transfer priority table of FIG. 5, refers to the transfer priority that is defined for the respective types in the selected class, and judges whether or not default transfer priorities for each program component that is included in the target program should be updated. If yes, the CPU 113 updates the applicable values to the predetermined ones.

After steps S205 to S207 are repeated, and after the processing is done with every class, the classes to be selected in step S204 would have all been gone by then. Thus, the CPU 113 determines that no class was selected in step S205, terminates the subroutine processing in FIG. 4, and then returns to the main routine processing in FIG. 3.

Referring back to FIG. 3, the CPU 113 selects the next program from the storage list of FIG. 2 (step S101), and assigns transfer priorities for each program component constituting the selected program (step S103). After steps S101 to S103 are repeated, and after every program in the storage list is assigned a transfer priority, the CPU 113 judges that there is no program to select next (step S102), and then advances to step S104.

In step S104, the CPU 113 initially sets a count value N of a counter which indicates a transfer priority (hereinafter, refers to as transfer priority counter) to a value of" 1" indicating the top transfer priority (step S104). Then, the CPU 113 judges whether or not the count value N of the transfer priority counter is 5 (step S105). Herein, four values of 1, 2, 3 and 4 are available as transfer priorities in the transfer priority table in FIG. 5. Therefore, if N=5, it means that every transfer priority is completely assigned. Since N=1 at the beginning, the CPU 113 determines that N≠5, and then advances to step S106.

In step S106, the CPU 113 selects one program component whose transfer priority is N (at the beginning, N=1) from the storage list of FIG. 2. Thereafter, the CPU 113 judges whether or not any program component was selected in step S106 (step S107). If yes, the CPU 113 takes out the attribute information of "event_id", "type", and "size" from the line of the storage list corresponding to the program component which is selected in step S106, and then transfers the same to the portable device 2 (step S108). Then, the CPU 113 takes out main data of the program component which is selected in step S1106, and transmits the same to the portable device 2 (step S109). Thereafter, the CPU 113 returns to step S106, selects another program component whose transfer priority is N from the storage list of FIG. 2, and then executes the transfer processing for the selected program component.

After steps S106 to S109 are repeated, and after each program component having the transfer priority of N is completely transferred, the CPU 113 judges that all the program components to be selected in step S106 are gone (step S107), increments the count value N of the transfer priority counter by 1 (step S110), and then returns to step S105. Then, the CPU 113 executes the transfer processing for the program component having the transfer priority of N (N=2) after the count value N of the transfer priority counter is updated.

After steps S105 to S109 are repeated, and after the transfer processing is done with every program component having the transfer priorities of 1 to 4, N=5. Thus, the CPU 113 judges that the transfer processing is completely done in step S105, and then terminates the processing.

FIG. 6 shows the structure of a receipt list which is to be stored in the memory 208 in the portable device 2. The receipt list is data that is used to manage how the data which is stored in the storage part 203 in the portable device 2 (that is, program data that is transmitted from the main device 1) is stored, and is table-structured. The lines of the table are in a one-to-one correspondence with the program components that are stored in the storage part 203. Also, each line of the table has six attributes including receipt order, off set, size, event_id, type, and length of play-back time.

The attribute "receipt order" indicates the order in which the portable device 2 receives the data of the program components from the main device 1, and a value does not appear more than once in the receipt list. Thus, the receipt order can be used as a key for specifying lines of the receipt list.

The attribute "offset" indicates where the program components being in the one-to-one correspondence with the lines of the receipt list are located in the data that is received from the main device 1. When transfer of the entire program from the main device 1 to the portable device 2 is presumably considered a bit stream or a file, the attribute "offset" represents the number of bites from the beginning of the transfer. The value of the offset can be represented simply in a bite or the number of blocks in a given size similar to the case where the attribute "size" in the storage list of FIG. 2 matters.

The attribute "size" represents a size of an area in the storage part 203 of the portable device 2 which is occupied by the program components being in the one-to-one correspondence with the lines of the receipt list. The attribute "size" is also represented in a similar unit to the attribute "offset".

The attribute "event_id" is attribute information that is used to identify to which program the program components being in the one-to-one correspondence with the lines of the receipt list respectively belong.

The attribute "type" is attribute information that is used to identify the types of the program components being in the one-to-one correspondence with the lines of the receipt list.

The attribute "length of play-back time" represents the length of play-back time when the program components being in the one-to-one correspondence with the lines of the receipt lines are played-back under the same conditions. When data transfer is interrupted halfway through for some reason, the number of bites of the transferred data is less than the number of bites of the same program component which is broadcast. In such a case, the length of play-back time is assigned a length of time corresponding to the transferred data.

Figure 7:
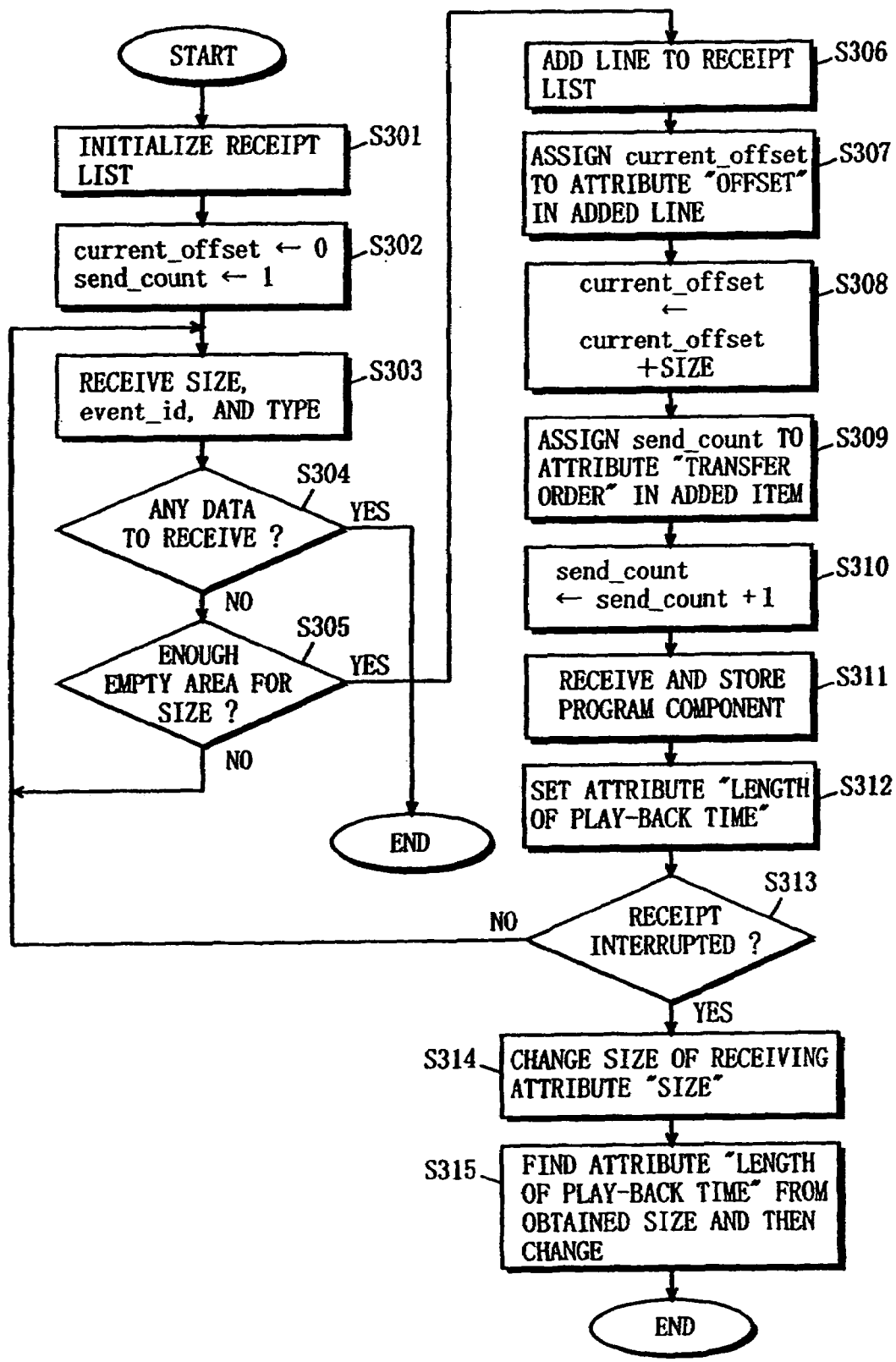
FIG. 7 is a flowchart illustrating an operation of the portable device 2 when receiving program data that is transferred from the main device 1 in the portable viewing/listening system of the first embodiment of the present invention.

FIG. 7 is a flowchart illustrating how the portable device 2 is operated to receive program data that is transmitted from the main device 1 in the portable viewing/listening system of the first embodiment. The processing in FIG. 7 can be realized when the CPU 209 in the portable device 2 executes program information which is stored in the memory 208 in the portable device 2. Through the processing, the program data that is transmitted from the main device 1 is stored in the portable device 2, the receipt list of FIG. 6 is also generated. Hereinafter, referring to FIG. 7, how the portable device 2 is operated to receive the program data transmitted from the main device 1 will be described.

First of all, the CPU 209 initializes the receipt list of FIG. 6 (step S301). The easiest way of initializing the receipt list is done by deleting every line thereof and, at the same time, deleting the program data that is stored in the storage part 203 in the portable device 2. Thereafter, the CPU 209 assigns a value of 0 to a variable current_offset, and assigns a value of 1 to a variable send_count (step S302). Then, the CPU 209 receives the attribute information of "size", "event_id", and "type" to be transmitted from the main device 1 (step S303). Such attribute information is the one that is transmitted in step S108 in FIG. 3. The CPU 209 then judges whether or not there is any data to receive in step S303 (step S304). If not, the CPU 209 terminates the operation, but if yes, the CPU 209 then judges whether or not an available region of the storage part 203 is sufficiently large for the value of the "size" which is obtained in step S303 (step S305). If yes, the CPU 209 goes to step S306, but if not, the CPU 209 returns to step S303.

In step S306, the CPU 209 adds a line to the receipt list of FIG. 6, and then assigns values which are obtained in step S303 to each corresponding attribute "size", "event_id", or "type" in the added line. Thereafter, the CPU 209 assigns the value of the variable current_offset to the attribute "offset" in the added line (step S307). The CPU 209 adds the value of "size" which is obtained in step S303 to the variable current_offset (step S308), and then assigns the value of the variable send_count to the attribute "receipt order" in the added line (step S309). The CPU 209 then increments the value of the variable send_count by 1 (step 5310). After performing step S310, the CPU 209 receives the main data of the program components that are transmitted from the main device 1, and then stores the same in the storage part 203 (step S311). Then, the CPU 209 sets the attribute "length of play-back time" (step S312). Herein, it is assumed that the main data of the program components itself includes, as additional information, a bit rate value indicating the number of data bit per unit presentation time. In this case, to convert the value of the "size" which is obtained in step S303 to the length of play-back time, the value of the "size" is divided by the bit rate that is obtained in the aforementioned manner. Note that, the value of the length of program time can be notified directly from the main device 1 as data as in the case with the "size", for example. Next, the CPU 209 judges whether or not a receipt of program data is discontinued halfway through for some reason (step S313). If yes, the CPU 209 advances to step S314, but if no, the CPU 209 returns to step S303. Such discontinuation may include a case, for example, where the users abruptly disconnect the portable device 2 from the main device 1, and vice versa.

In step S314, the CPU 209 finds a value of the attribute "size" in the receipt list from the size of the program component which is actually stored in the storage part 203, and resets the value (step S314). Then, the CPU 209 obtains, in a similar manner to step S312, a value for the length of play-back time from the value of the attribute "size" in the receipt list, and then resets the "length of play-back time" in the receipt list (step S315). Then, the CPU 209 terminates the processing for receiving.

Figure 8:
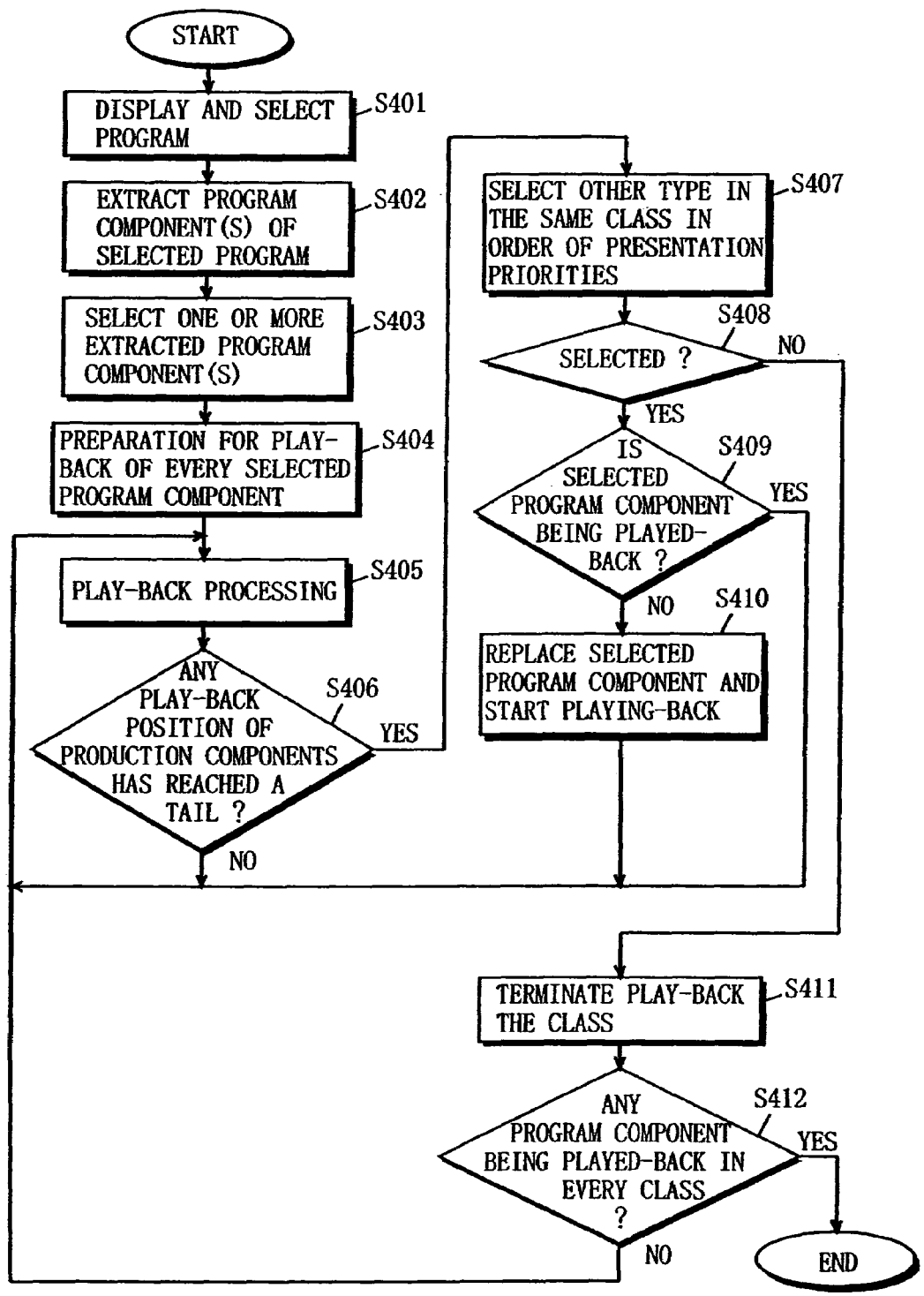
FIG. 8 is a flowchart illustrating how the portable device 2 is operated to play-back a program in the portable viewing/listening system of the first embodiment of the present invention.

FIG. 8 is a flowchart illustrating how the portable device 2 is operated to play-back the program. This processing can be realized when the CPU 209 executes the program information which is stored in the memory 208 in the portable device 2. Hereinafter, by referring to FIG. 8, how the portable device 2 is operated to play-back the program will be described.

First, a description of a class table that is used to play-back the program is as follows. FIG. 9 is an exemplary class table. The class table is, for example, stored in the memory 208, and the CPU 209 is at liberty to access the class table. As shown in FIG. 9, lines of the class table are in a one-to-one correspondence with the types of the program components, and each line has three attributes of "type", "class", and "presentation priority".

In FIG. 9, the attribute "class" shows the classified types of the program components. By taking this class table as an example, two classes of "script" and "display" are defined therein. The first and second lines thereof show that closed caption and audio are instances belonging to the same class of "script", and the third and fourth lines thereof show that digest video and detailed video are instances belonging to the same class of "display". The attribute "presentation priority" defines in which order the program components in varying types classified into the same class should be presented to the users. In this example, the smaller value has the higher presentation priority. Such class table is referred to to search for some other program components for replacement when the program component being played-back is interrupted halfway.

By referring to FIG. 8, the CPU 209 first executes displaying and selecting operation of the programs (step S401). To be more specific, the CPU 209 generates a list of the programs stored in the storage part 203 by referring to the receipt list of FIG. 6, and then displays the generated list on the display 205. Thereafter, the CPU 209 let the users select any program which is desired to be played-back from the displayed list. The selection of the programs is done through the user input-output part 207. When it is desired for the list of the programs displayed on the display 205 to include titles of the programs as well, data indicating the title-to-"event_id" relationship may be sent along with the titles during transmission of the program data from the main device 1 to the portable device 2. For such data indicating the relationship, additional information to be transmitted through broadcasting for the EPG (Electric Program Guide) may be used. Next, the CPU 209 extracts, from the receipt list, each program component of the program which is selected in step S401 to be played-back (step S402). Thereafter, the CPU 209 generates a list of the program components constituting the selected program according to the extraction result in step S402, and then displays the generated list on the display 205 (step S403). In response thereto, the users select one or more program component (s) to be played-back from the displayed list. The selection of the program components is done through the user input-output part 207. Then the CPU 209 makes a preparation for concurrent play-back of all of the program components which are selected in step S403 (step S404). By concurrently playing-back the program components, lip synch can be attained, for example, which is synchronization between a speaker's lip movements in the video and audio.

Thereafter, the CPU 209 executes a play-back processing of the program components which are prepared in step S404 (step S405). The CPU 209 then judges whether or not any play-back position of the program components being played-back has reached to a tail (end) of the data (step S406). There may be a case where the data is completely played-back, or a case where the data is interrupted. If none of the play-back positions of the program components has reached to the tail, the CPU 209 returns to step S405 so as to continue the play-back processing. On the other hand, if any play-back position of the program components has reached to the tail, the CPU advances to step S407.

In step S407, the CPU 209 selects any other program component in the same class as the program component whose play-back position has reached to the data tail but in different type in the order of presentation priorities that are defined in the class table of FIG. 9. To be more specific, the CPU 209 first extracts every program component constituting the program that is being played-back from the receipt list of FIG. 6, and then selects, from among the extracted program components, any program component belonging to the same class as the program component whose play-back position is judged to have reached to the data tail in step S406. Thereafter, the CPU 209 takes out any program component, from among the selected program components, whose presentation priority is lower than the one whose play-back position has reached to the data tail, and then selects the type of the program component whose presentation priority is the highest from among the taken-out program components. When the play-back position of the program component in type "V" presumably reaches to the data tail during play-back, the CPU 209 selects the type "D", which is in the same class of "display" as the type "V", and which has the presentation priority lower than the type "V" but the highest among the rest.

Thereafter, the CPU 209 judges whether or not any type is selected in step S407 (step S408). If yes, the CPU 209 then judges whether or not the program component in the type which is selected in step S407 is already being played-back (step S409). This first embodiment takes a structure where the users can simultaneously select, in step S403, a plurality of program components in varying types which are classified into the same class. Therefore, the program component in the type which is selected in step S407 may possibly be already being played-back. For example, if the play-back position of the program component in type "V" reaches to the data tail when the program components in type "D" and "V" are concurrently being played-back, the data of the program component in type "D" is selected instep S407 as described above. In such a case, the CPU 209 returns to step S405 so as not to repeatedly play-back the program component in the same type, and thus does not replace the interrupted program component with others to be played-back. On the other hand, if the program component in the type which is selected in step S407 is not yet played-back, the CPU 209 replaces the interrupted program component with the program component in the selected type to be played-back (step S410). In this case, the CPU 209 does not start playing-back from the beginning of the program component in the type selected in step S407. Instead, the CPU 209 starts playing-back from the continued part of the interrupted program component. In this example, closed caption and audio are in the same class. Even if the data of audio is interrupted, closed caption thus may take the place by being playing-back from the interrupted part. In this manner, the users can enjoy the program not with audio but with closed captions. Thereafter, the CPU 209 returns to step S405.

On the other hand, when no type was selected in step S408, the CPU 209 determines that there is no more component to replace to play-back, and then terminates the play-back processing for the class (step S411). This may happen when the users have selected the type having the lowest presentation priority. Also, this may happen when the target program is completely played-back. At this time, the CPU 209 changes a value of a flag variable indicating the play-back processing being executed on the class basis into a value indicating the processing being terminated. Then, the CPU 209 judges whether or not the program component being played-back is completely played-back. This judgement is made by referring to the value of the aforementioned flag variable. If any program component is still being played-back in whatever the class, the CPU 209 returns to step S405 so as to continue the play-back processing for other classes. On the other hand, if the target program is completely played-back, the program components being played-back in each class are terminated. Thus, the CPU 209 terminates the play-back processing of the program.

Figure 10:
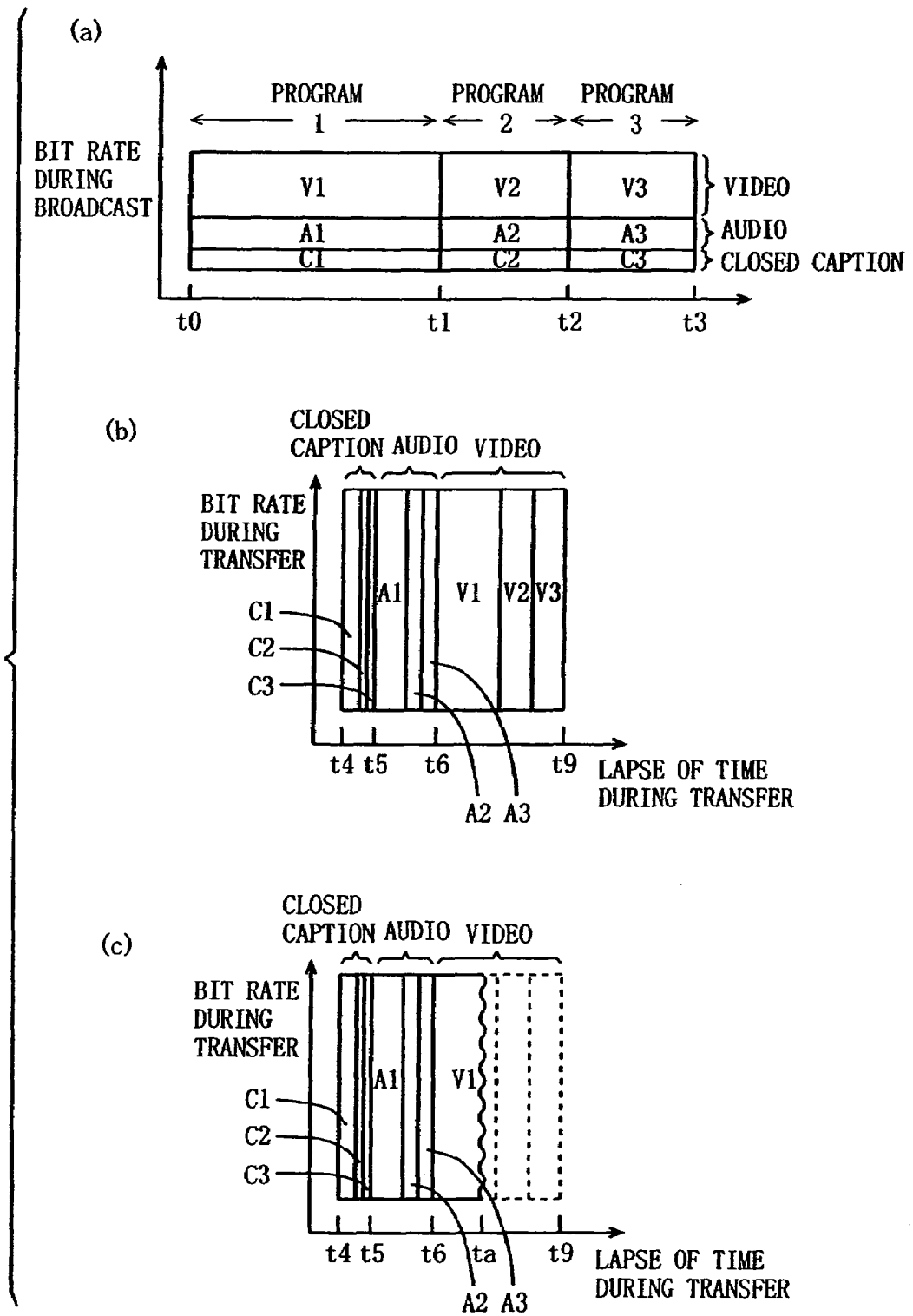
FIG. 10 is a diagram illustrating how data is transferred in the portable viewing/listening system in FIG. 1.

FIG. 10 is a diagram illustrating how data is transferred in the portable viewing/listening system of FIG. 1. Hereinafter, how data is transferred in the portable viewing/listening system of FIG. 1 will be described in detail.

FIG. 10(*a*) shows a time transition of data constituting the program to be broadcast. In FIG. 10(*a*), a lateral axis indicates a lapse of time during broadcast, and a vertical axis indicates a bit rate during broadcast, respectively. In detail, FIG. 10(a) shows that the Program 1 is broadcast between Time t0 and Time t1, the Program 2 is broadcast between Time t1 and Time t2, and the Program 3 is broadcast between Time t2 and Time t3, respectively. Further, the Program 1, Program 2, and Program 3 are respectively provided with audio, closed caption, and video as a program component (mono-media constituting the program). For the sake of simplicity, the length of broadcast time for the Program 2 (t2–t1) and the length of broadcast time for the Program 3 (t3–t2) are equal, and the length of broadcast time of the Program 1 (t1–t0) is exactly twice the length of broadcast time for the Program 2 (or Program 3). Further, a bit rate for the respective program components remains invariant no matter which program, and thus, a ratio among a bit rate of closed caption bc, a bit rate of audio bα, and a bit rate of video by is always 1:2:4.

Figure 18:
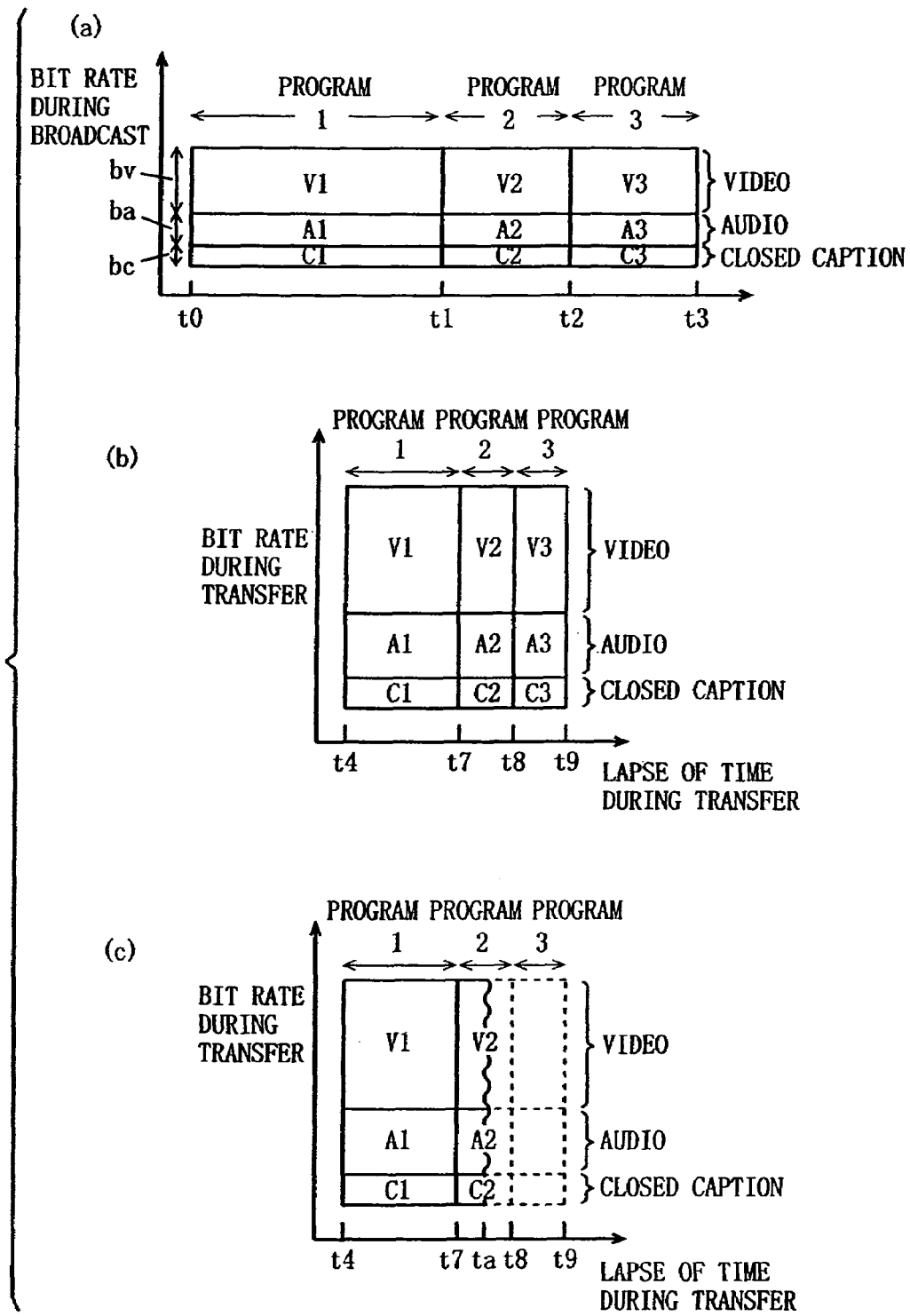
FIG. 18 is a diagram illustrating a data transfer system which is adopted in a conventional portable viewing/listening system.

FIG. 10(b) shows a time transition which takes place when program data is transferred from the main device 1 to the portable device 2. In FIG. 10(b), a lateral axis indicates a lapse of time for a data transfer operation, and a vertical axis indicates a bit rate during transfer, respectively. It is assumed that transfer is started at Time t4 as in the conventional system shown in FIG. 18(b). As the total number of bits to be transferred is equal to the example in FIG. 18, the data is completely transferred at Time t9 as is in the conventional system. In FIG. 10(b), each closed caption part of the programs to be transferred (Program 1, Program 2, and Program 3) is first transferred between Time t4 to Time t5, each audio part thereof is then transferred between Time t5 to Time t6, and lastly each video part thereof is transferred between Time t6 to Time t9. As described above, the rate among the program components of closed caption, audio, and video during broadcast is 1:2:4. Therefore, the length of time which is taken to transfer closed caption of the programs (t5–t4), the length of time which is taken to transfer audio thereof (t6–t5), and the length of time which is taken to transfer video thereof (t9–t6) are respectively expressed by the following equations (1), (2) and (3).

$$(t5-t4)=(t9-t4)X\{1/(1+2+4)\} \quad (1)$$

$$(t6-t5)=(t9-t4)X\{2/(1+2+4)\} \quad (2)$$

$$(t9-t6)=(t9-t4)X\{4/(1+2+4)\} \quad (3)$$

Further, t6 can be represented by the following equation (4).

$$t6=t4+[(t9-t4)X\{(1+2)/(1+2+4)\}] \quad (4)$$

FIG. 10(c) shows, in the portable viewing/listening system in FIG. 1, a case where the transfer of program data is interrupted at Time tα. In this example, Time to presumably satisfies t6<to<t9. Even if the transfer of the program data is discontinued halfway through at Time tα, audio components and closed caption components for the respective programs are completely transferred by then. At this stage, in the portable device, the programs are not available in video but in closed caption and audio. This means that, the users can be informed of the contents thereof to some extent. In other words, the users can enjoy every program with closed caption and audio, although not with video. In a practical sense, the bit rates of the closed caption and audio are rather high as compared to bit rates of the video. In this sense, Time t6 when every closed caption component and audio component are completely transferred possibly comes at much earlier timing than Time 9 when the program is entirely transferred with the video components. In particular, the length of time which is required for transferring the video (t9–t6) is rather long as compared to the length of time which is for transferring the closed caption components and the audio components (t6–t4). Therefore, the audio components may highly-possibly be entirely transferred even if transfer is stopped in a rather short time. Further, as is transferred in text, the bit rate of the closed caption components can be lowered to a greater extent than the bit rate of the audio components. Therefore, transfer of the closed caption components can be completed much quicker than the transfer of the audio components.

Figure 11:
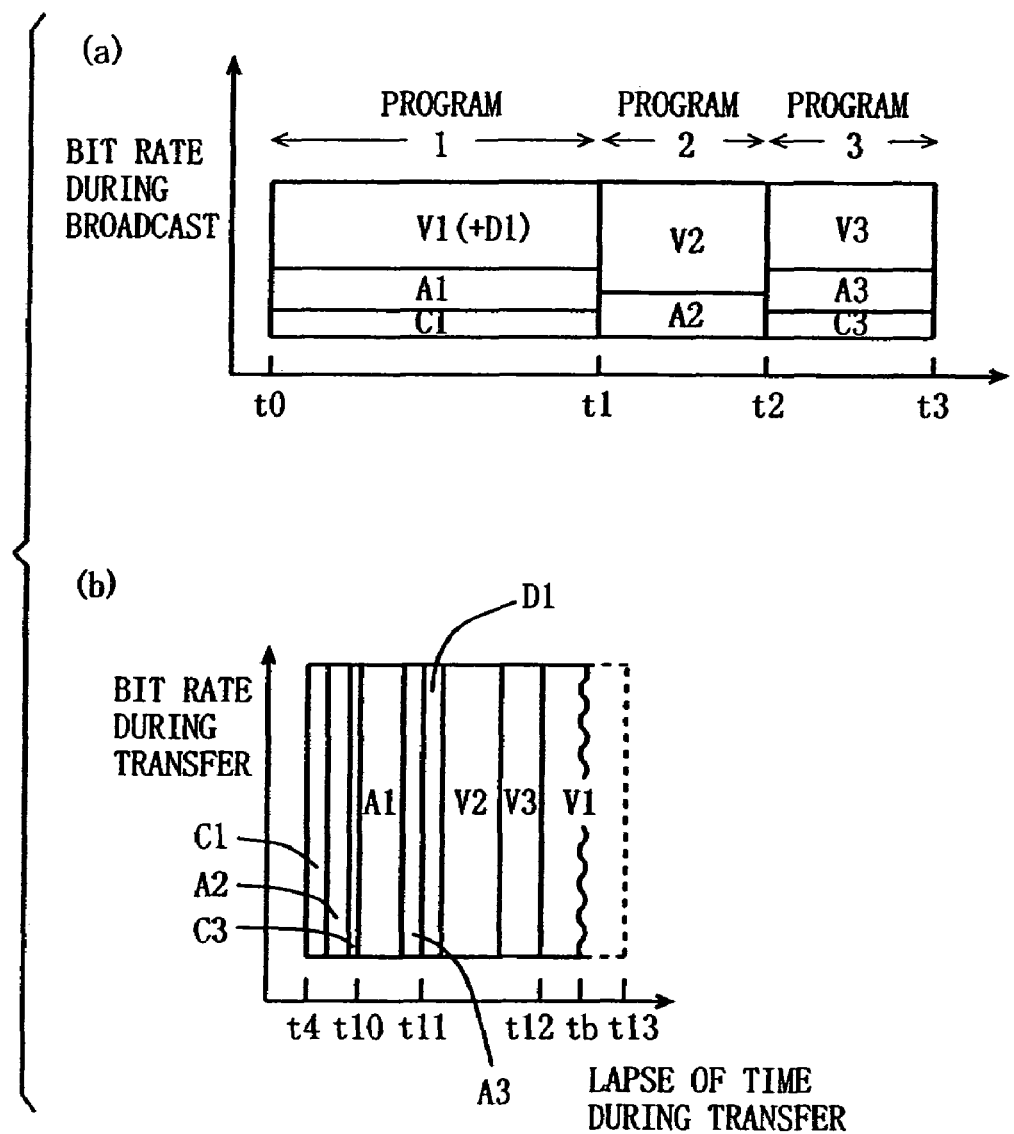
FIG. 11 is a diagram showing a time transition which takes place during a program transfer in a case where data to be transferred includes a digest video in the portable viewing/listening system in FIG. 1.

FIG. 11 shows a time transition which takes place to transfer the program in a case where data to be transferred includes a digest video in the portable viewing/listening system in FIG. 1. The case herein is somewhat complicated as compared to the case in FIG. 10.

FIG. 11(a) shows a time transition for information of the program to be broadcast. This example herein is different from the example in FIG. 10(a) in that the Program 1 includes a digest video D1 in a detailed video V1, and the Program 2 does not include a closed caption C2. The bit rate without the closed caption C2 is assigned to a detailed video V2, and thus the detailed video V2 is increased by the closed caption C2 as much as the other programs.

FIG. 11(b) shows a time transition which takes place when the program is transferred. First of all, by taking transfer started at Time t4 as an example, information that is sufficient to play-back every program to some extent is transferred by Time t10. This means that closed caption is transferred to the Programs 1 and 3, and audio is transferred to the Program 2. Note that the program components to be transferred between Time t4 to Time 10 are the ones having the transfer priority of 1 in the storage list of FIG. 12.

Thereafter, the program components in the "script" class which are not transferred before the lapse of Time t10 are transferred between Time t10 to Time t11. By being completely transferred by Time t10, the audio of the Program 2 is not transferred at this stage. The program components to be transferred between Time t10 to Time t11 are the ones having the transfer priority of 2 in the storage list of FIG. 12.

After Time t11, video begins to be transferred. First of all, the digest video D1 of the Program 1 is transferred. The digest video is equal to the detailed video in the sense but has less information. Having less information means a state, for example, in which on-screen resolution is low or time-axis resolution is low, for example, a frame in a few seconds.

When encoding of the detailed video is hierarchical encoding such as resolution scalability defined in MPEG-2 Video, for example, where videos in a plurality of layers are included in codes, data of the digest video can be obtained by selectively extracting the codes in a particular layer. Further, encoding by a hierarchical transfer method can be done in a similar manner to the hierarchical encoding. Alternately, in a case where a scene being a part on the time-axis of the program is specified by program index codes which are adopted in the digital broadcasting system in Japan, only the video in one or more scenes that is specified by the index as being more important can be taken out as the digest video. In this case, the remaining scenes do not have video data. However, by displaying the last frame having the video data or by blacking out, it can be regarded as one program component in series.

The videos are transferred between Time t11 and Time t12. In detail, the detailed video is transferred to the Programs 2 and 3, and the digest video being similar to the detailed video in the sense but having ha less information is transferred to the Program 1. The videos become available to some extent for every program at Time t12. The program components to be transferred between Time t11 and Time T12 are the ones having the transfer priority of 3 in the storage list of FIG. 12.

Lastly, the detailed video V1 of the Program 1 beings is to be transferred from Time t12. For the transfer that is started from Time t12, the program components having the transfer priority of 4 in the storage list of FIG. 12 are transferred. It is herein assumed that the detailed video V1 of the Program 1 was supposed to be completely transferred by Time t13 but was interrupted at Time tb exactly at the halfway between Time t12 and Time t13. If this is the case, as to the program components in the "display" class of the Program 1, the digest video is wholly transferred but the detailed video is only half-transferred, i.e., only the first-half of the detailed video is transferred. Even if data transfer is interrupted due to such eventuality, the users can enjoy the program with video to some extent because the video information is already provided to every program to some extent. Further, even if the data transfer is interrupted at an earlier stage, the users can enjoy the program with closed caption (additionally, audio).

FIG. 12 is an exemplary storage list which is to be generated in a case where the received data includes a digest video in the main device 1 of FIG. 1. In FIG. 12, the Program 1 has the digest video in the program component (the third line of the storage list; in the receipt list, the sixth program component to be received). Accordingly, in the processing described in FIG. 4 where transfer priorities are determined (step S206), there is a digest video having the top transfer priority which is defined for the "display" class. Consequently, the processing of step S207 which re-writes the transfer priorities is not executed. Therefore, the digest video "D" and the detailed video "V", both of which are the types of the program components which are classified into the "display" class, are set to the transfer priorities by default. Further, as the Program 2 does not have closed caption having the top transfer priority defined for the "script" class, by step S207, the transfer priority of audio "A" is changed into the value of 1 which is defined as being the top priority for the "script" class.

FIG. 13 is an exemplary receipt list which is to be generated when the data that is transferred from the main device 1 to the portable device 2 of FIG. 1 includes a digest video. In FIG. 13, as to the Program 1, the portable device 2 receives the entire digest video of 30 minutes, but receives only the first-half of the detailed video of 15 minutes. In this manner, in step S406, the detailed video reaches to the tail of data 15 minutes after the start of play-back of the detailed video and audio in the play-back processing of the program described in FIG. 8 (step S405). Thereafter, the digest video being the program component in the "display" class after the lapse of 15 minutes is found in step S407, and then is stated to be played-back as a replacement for the detailed video in step S410. The play-back image of the Program 1 is accordingly lowered in quality after the lapse of 15 minutes from the start, but, is still sufficient for the users to enjoy the program.

Second Embodiment

Figure 14:
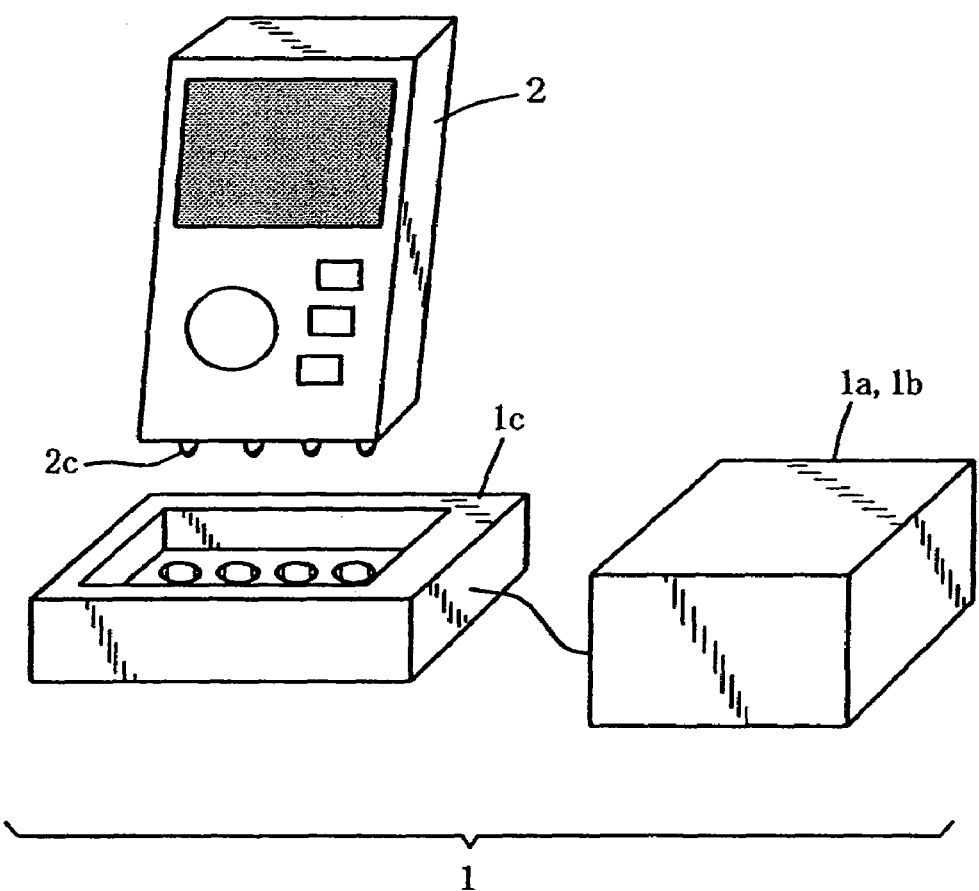
FIG. 14 is an outer perspective diagram showing the physical structure of a portable viewing/listening system according to a second embodiment of the present invention.

FIG. 14 is an outer perspective diagram showing the physical structure of a portable viewing/listening system according to a second embodiment of the present invention. Further, FIG. 15 is a block diagram showing the electrical structure of the portable viewing/listening system according to the second embodiment of the present invention. By referring to FIGS. 14 and 15, the main device 1 includes a processing part 1a, a charging part 1b, and a cradle-type box 1c (hereinafter, refer to as cradle) onto which the portable device 2 can be placed. The portable device 2 includes a processing part 2a, a battery 2b, and a connection contact 2c. The processing part 1a is similar in structure to the main device 1 shown in FIG. 1, and the processing part 2a is similar in structure to the portable device 2 shown in FIG. 1.

By placing the portable device 2 on the cradle 1c, the portable device 2 is electrically connected to the main device 1 via the connection contact 2c. Furthermore, in the meantime, the charging part 1b which is provided in the main device 1 charges the battery 2b in the portable device 2 through the connection contact 2c. As the portable device 2 is relatively-high power, a rechargeable so-called secondary battery is popular for the battery 2b provided therein. Consequently, the battery 2b needs to be regularly charged every day, and this thus necessitates the portable device 2 to be physically connected to some types of charger. According to the second embodiment, when any physical connection for the to-be-required charging is made, information such as programs can be advantageously transferred at the same time. Therefore, rather conveniently, there is no need to make any new connection for transfer. Note that, the charging part 1b may monitor charging current and detect the start of a connection, and then notifies the detection to the processing part 1a so as to start the transfer processing of the program. In this manner, rather conveniently, program transfer is automatically started by only placing the portable device 2 on the cradle 1c.

Third Embodiment

Figure 16:
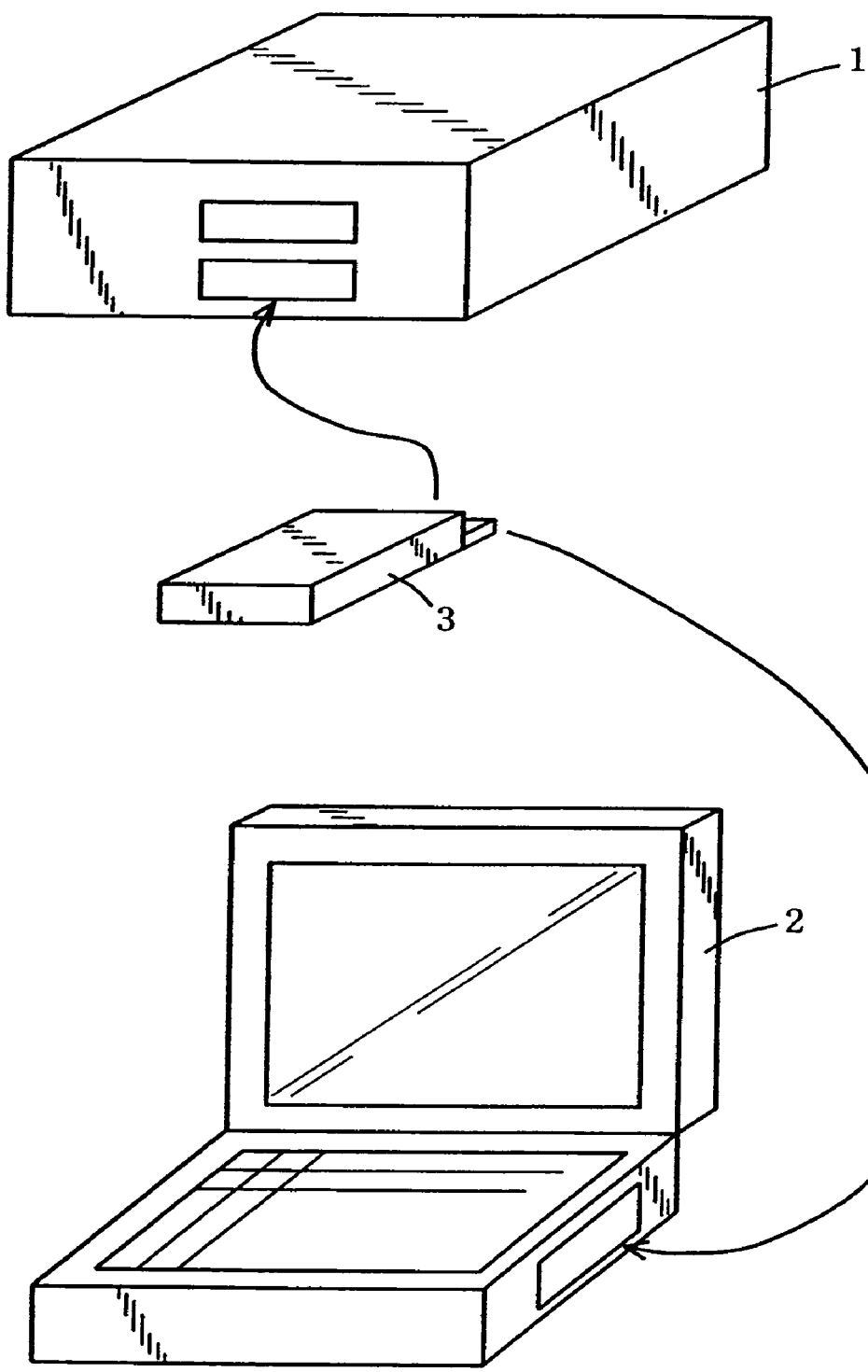
FIG. 16 is an outer perspective diagram showing the physical structure of a portable viewing/listening system according to a third embodiment of the present invention.

FIG. 16 is an outer perspective diagram showing the physical structure of a portable viewing/listening system according to a third embodiment of the present invention. By referring to FIG. 16, in the portable viewing/listening system of the third embodiment, data transfer from the main device 1 to the portable device 2 is done indirectly via a recording medium 3. To be more specific, the recording medium 3 is written with information such as a program when being attached to the main device 1, and is read out the internally-stored program information, for example, when being attached to the portable device 2. In such a manner, in the third embodiment, program transfer or information exchange can be done in a similar manner to the first embodiment via the recording medium 3. The recording medium 3 includes a hard disk card or a semiconductor recording card in PCMCIA Standards, for example.

In the third embodiment, the main device 1 is provided with a digital broadcasting receiver which is equipped with a slot of DVB-CI (Digital Video Broadcasting—Common Interface). The DVB-CI is a specification that is standardized by the standardization group in Europe called DVB, and specifies the receiver to be equipped with a slot of PCMCIA and the slot to be an insertable type for a descrambler of a PC card in PCMCIA Standards. Accordingly, with a plurality of slots provided and a plurality of descramblers inserted, the receiver can correspond to various cryptographic methods. For the DVB-CI, PCMCIA which is normally equipped with a note-type PC (Personal Computer) as a physical and electrical interface is used. For some receivers, it is structurally possible to function in a similar manner to the main device 1 in FIG. 1 only by updating a software in the existing digital broadcast receiver by way of a download through broadcasting.

In the third embodiment, the portable device 2 is the note-type PC. Thanks to the improving-performance of the CPU, for example, the video and audio of the MPEG-2 can be decoded only through software processing. Therefore, only by installing a computer program which executes the processing for the portable device in the existing-type of the note-type PC, an operation similar to that of the portable device 2 can be attained. Note that the aforementioned computer program is written to the recording medium 3 by the main device 1, for example, and then is read out by the portable device 2 and executed. In such a manner, there is no need to have a special operation in which the program is downloaded from the network so as to obtain the program in the portable device 2.

Fourth Embodiment

Figure 17:
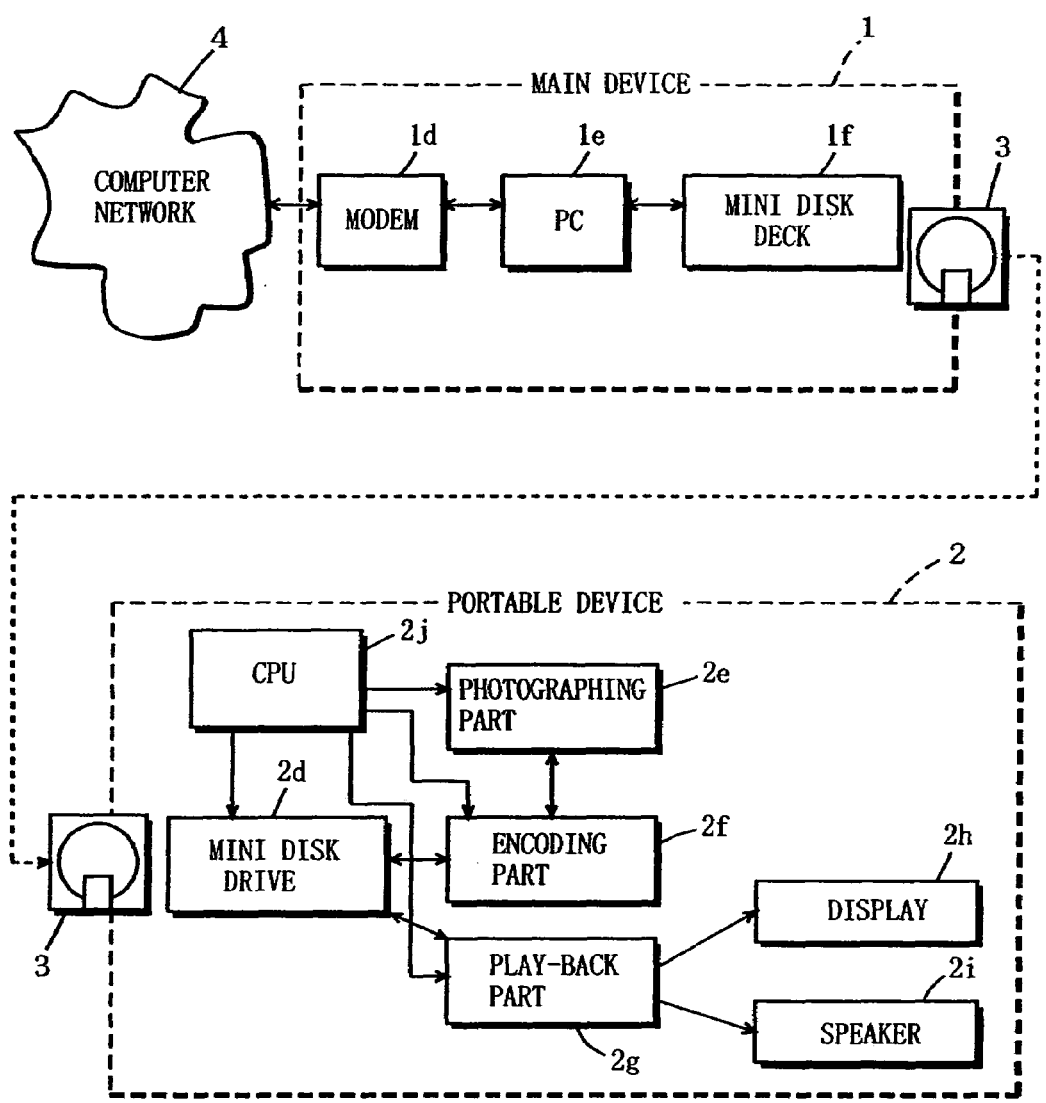
FIG. 17 is a block diagram showing the structure of a portable viewing/listening system according to a fourth embodiment of the present invention.

FIG. 17 is a block diagram showing the structure of a portable viewing/listening system according to a fourth embodiment of the present invention. In the fourth embodiment, it is assumed that an information source for the main device 1 is not broadcast but is broadcast-type service from a computer network 4 such as Internet.

In the fourth embodiment, the main device 1 is provided with a modem 1d, a PC (personal computer) 1e, and an MD (Mini Disk) deck 1f which is used to exchange data in the computer network 4. The modem id, PC 1e, and MD deck 1f are interconnected through a high-speed digital interface such as IEEE1394. In this example, the PC 1e functions in a similar manner to the main device in FIG. 1 by executing a predetermined computer program. The recording medium 3 may include a package medium such as MD.

In the fourth embodiment, the portable device 2 is structured as a audio-playback-capable digital still camera including an MD drive 2d, a photographing part 2e, an encoding part 2f, a reproduction (play-back) part 2g, a display 2h, a speaker 2i, and a CPU 2j. Note that the CPU 2j controls an operation of a predetermined circuit block (for example, the MD drive 2d, the photographing part 2e, and the encoding part 2f). By operating the CPU 2j which is provided for the digital still camera in accordance with the predetermined computer program, the digital still camera is structured to function in a similar manner to the portable device 2 in FIG. 1 in addition to a typical function for a general camera. Note that the recording medium 3 is not limited to the MD. Further, the portable device 2 may directly receive data from the main device 1 in a structure where the main device 1 is connectable to the portable device 2.

In the embodiments described above, every program data that is stored in the main device 1 is set to be transferred to the portable device 2. However, only the program data which is selected by the users from among the program data that is stored in the main device 1 may be transferred to the portable device 2. If this is the case, the EPG (Electric Program Guide) data may be previously transferred from the main device 1 to the portable device 2, and then the users may preselect any program data which are desired to be received from the main device 1 while taking a look at the program guide at their convenience. In detail, the main device 1 recognizes the programs that are preselected in the portable device 2 when the portable device 2 is attached thereto, and then transfers only the applicable program data to the portable device 2.

INDUSTRIAL APPLICABILITY

The present invention is suitable for a case where a program that is received by a main device and stored therein is to be easily enjoyed with a portable device.

What is claimed is:

1. A portable viewing/listening system comprising a fixedly or semi-fixedly installed main device and an easy-to-carry portable device, wherein said main device is operable to receive program data and said portable device is operable to play-back the received program data so as to provide a user with the program data;
   wherein said main device comprises:
      receiving means for receiving program data provided through broadcasting;
      demultiplexing means for demultiplexing the program data received by said receiving means into program components each program component representing data of a multimedia type and spanning a same play-back length as the program data;
      primary storing means for storing the program components constituting the program data received by said receiving means;
      transfer priority assigning means for assigning a transfer priority and class to each program component constituting the program data stored in said primary storing means; and
      transferring means for discretely transferring, to said portable device, each of the program components of the program data stored in said primary storing means in the direction of a time axis in order of the transfer priority assigned by said transfer priority means to each program component of the program data stored in said primary storing means; and
   wherein said portable device comprises:
      secondary storing means for storing the program components to be discretely transferred from said transferring means;
      re-constructing means for re-constructing program data to be played-back from the program components constituting the program data stored in said secondary storing means;
      replacing means for substituting, when the program data stored in said secondary storing means contains an incomplete program component, the incomplete program component at a point of discontinuation of the incomplete program component with a corresponding remainder portion of another program component in a same class as the incomplete program component; and
      playing-back means for playing-back the program data re-constructed by said re-constructing means.

2. The portable viewing/listening system according to claim 1, wherein said transfer priority assigning means assigns transfer priorities to each of the program components in such a manner that a program component with a lesser amount of data has a higher transfer priority.

3. The portable viewing/listening system according to claim 2, wherein said main device further comprises transfer priority defining means for previously defining default transfer priorities to each type of the program components, and
   said transfer priority assigning means assigns the default transfer priorities to each of the program components in accordance with a definition provided by said transfer priority defining means.

4. The portable viewing/listening system according to claim 3, wherein, when a plurality of the program data stored in said primary storing means is collectively transferred to said portable device, said transferring means selects any program component having the same transfer priority from each of the program data, combines the selected program components into a unit, and then discretely transfers the combined unit in the direction of the time axis in order of the transfer priority assigned to each combined unit.

5. The portable viewing/listening system according to claim 4, wherein:
   said transfer priority defining means classifies the class of each program component;
   program components of the program data which are replaceable with each other during playing-back are assigned in a same class; and said transfer priority assigning means checks each class for the default transfer priority assigned to each of the program components by said transfer priority assigning means, and then changes, in accordance with a result of the check, the default transfer priority assigned to each of the program components on a class basis, as required.

6. The portable viewing/listening system according to claim 5, wherein, when no program component in the same class has a value that is defined as being a top transfer priority therein, said transfer priority assigning means changes a value of a program component which is currently assigned the highest transfer priority in the class to the value that is defined as being the top transfer priority therein.

7. The portable viewing/listening system according to claim 1, wherein said main device further comprises program component generating means for generating a new program component from the program components of the program data received by said receiving means, and said storing means adds the new program component generated by said program component generating means to the program data received by said receiving means, and stores the received program data having the new program component added thereto.

8. The portable viewing/listening system according to claim 1, wherein said portable device further comprises replacing means for replacing program component data constituting the program data to be played-back and wherein, when any data of the program component constituting the program data re-constructed by said re-constructing means is discontinued halfway during play-back by said playing-back means, said replacing means has any other program component not being currently played-back be played-back as a replacement.

9. The portable viewing/listening system according to claim 8, wherein said portable device further comprises presentation priority defining means for previously defining presentation priorities to each type of the program components, and said replacing means determines a program component to be played-back as a replacement in accordance with the definition provided by said presentation priority defining means.

10. The portable viewing/listening system according to claim 9, wherein said presentation priority defining means classifies types of the program components into a plurality of classes, and said replacing means determines a program component to be played-back as a replacement from among the program components belonging to the same class to which the program component discontinued during play-back belongs.

11. The portable viewing/listening system according to claim 1, wherein said main device and said portable device are structured so as to be electrically interconnectable, and said transferring means online-transfers each program component of the program data stored in said primary storing means directly to said portable device.

12. The portable viewing/listening system according to claim 11, wherein said main device further comprises:

attaching means for allowing said portable device to be electrically connected to said main device; and charging means for supplying power so as to charge said portable device when the portable device is attached to said attaching means;

wherein said portable device further comprises a battery to be charged by the power supplied from said charging means.

13. The portable viewing/listening system according to claim 1, wherein said transferring means offline-transfers each program component of the program data stored in said primary storing means to said portable device through a recording medium.

14. The portable viewing/listening system according to claim 13, wherein said main device further comprises writing means for writing any program component to be transferred to said portable device into said recording medium, and said portable device further comprises reading means for reading the program component recorded in said recording medium.

15. The portable viewing/listening system according to claim 1, wherein said receiving means receives program data through a computer network.

16. A portable device for receiving and playing-back program data received by a fixedly or semi-fixedly installed main device so as to provide a user with the received program data, said portable device comprising:

secondary storing means for storing each program component constituting the program data to be discretely transferred from the main device, each program component representing data of a multimedia type and spanning a same play-back length as the program data;

re-constructing means for re-constructing program data to be played-back from the program components stored in said secondary storing means;

replacing means for substituting, when the program data stored in said secondary storing means contains an incomplete program component, the incomplete program component at a point of discontinuation of the incomplete program component with a corresponding remainder portion of another program component in a same class as the incomplete program component; and playing-back means for playing-back the program data re-constructed by said re-constructing means.

17. The portable device according to claim 16, further comprising replacing means for replacing program component data constituting the program data to be played-back wherein, when any data of the program component constituting the program data reconstructed by said re-constructing means is discontinued halfway during play-back by said playing-back means, said replacing means has any other program component not being currently played-back be played-back as a replacement.

18. The portable device according to claim 17, further comprising presentation priority defining means for previously defining presentation priorities to each type of the program components, and said replacing means determines a program component to be played-back as a replacement in accordance with a definition provided by said presentation priority defining means.

19. The portable device according to claim 18, wherein said presentation priority defining means classifies types of the program components into a plurality of classes, and said replacing means determines a program component to be played-back as a replacement from among the program components belonging to the same class to which the program component discontinued during play-back belongs.

* * * * *